(12) United States Patent
Mu et al.

(10) Patent No.: US 8,472,868 B2
(45) Date of Patent: Jun. 25, 2013

(54) METHOD AND APPARATUS FOR MIMO REPEATER CHAINS IN A WIRELESS COMMUNICATION NETWORK

(75) Inventors: Fenghao Mu, Hjärup (SE); Stefan Andersson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 787 days.

(21) Appl. No.: 12/639,169

(22) Filed: Dec. 16, 2009

(65) Prior Publication Data

US 2010/0284446 A1 Nov. 11, 2010

Related U.S. Application Data

(60) Provisional application No. 61/176,088, filed on May 6, 2009.

(51) Int. Cl.
*H04B 3/36* (2006.01)

(52) U.S. Cl.
USPC ............... 455/7; 370/279; 370/280; 375/211

(58) Field of Classification Search
USPC .................................................. 455/7
See application file for complete search history.

(56) References Cited

U.S. PATENT DOCUMENTS

| | | | | |
|---|---|---|---|---|
| 4,506,383 | A * | 3/1985 | McGann | 455/17 |
| 5,765,097 | A * | 6/1998 | Dail | 725/125 |
| 6,046,978 | A * | 4/2000 | Melnik | 370/221 |
| 6,208,247 | B1 * | 3/2001 | Agre et al. | 340/539.19 |
| 6,421,372 | B1 * | 7/2002 | Bierly et al. | 375/143 |
| 6,473,617 | B1 * | 10/2002 | Larsen et al. | 455/446 |
| 6,826,165 | B1 * | 11/2004 | Meier et al. | 370/338 |
| 6,842,430 | B1 * | 1/2005 | Melnik | 370/254 |
| 6,980,601 | B2 * | 12/2005 | Jones | 375/261 |
| 7,046,166 | B2 * | 5/2006 | Pedyash et al. | 340/870.07 |

(Continued)

FOREIGN PATENT DOCUMENTS

| | | |
|---|---|---|
| EP | 1804442 A1 | 7/2007 |
| WO | 2005/064872 A1 | 7/2005 |
| WO | 2008/007375 A2 | 1/2008 |
| WO | 2008/106797 A1 | 9/2008 |

OTHER PUBLICATIONS

Murai, H. et al. "LTE-Advanced—The solution for IMT-Advanced." Ericsson Research slides, Jun. 11, 2008. Available at: http://edu.tta.or.kr/upload/15/sub/08_Ericsson_LTE%20Advanced%20_TTA%20IMT-A%20WS.pdf.

Ko, Young-Jo. "Potential Technologies for LTE-Advanced." Electronics and Telecommunications Research Institute, Next Generation Mobile Communication Research Team, Jun. 11, 2008. Available at: edu.tta.or.kr/sub3/down.php?No=15&file=07_TTA...LTE_Adv.pdf.

(Continued)

*Primary Examiner* — Hai V Nguyen
(74) *Attorney, Agent, or Firm* — Coats & Bennett, P.L.L.C.

(57) ABSTRACT

In one or more embodiments taught herein, a multi-band MIMO repeater is configured to translate normal wireless mobile bands into other frequency bands in the physical layer. An advantageous, multi-hop repeater chain includes two or more such repeaters, for propagating downlink signals from a base station, and for propagating uplink signals to the base station. Each such repeater may use paralleled homodyne structure transceivers for better SNR, spectrum combiners for uplink signal aggregation, spectrum separators for downlink signal de-aggregation, water mark signal inserters for optimization, and, among other things, spectrum analyzers for frequency band selection. In at least one such embodiment, a multi-hop repeater chain is configured for MIMO operation in an LTE Advanced or other MIMO network, to deliver high data rate over larger distances—e.g., further away from cell base stations.

47 Claims, 22 Drawing Sheets

U.S. PATENT DOCUMENTS

| | | | |
|---|---|---|---|
| 7,139,527 B2* | 11/2006 | Tamaki et al. | 455/16 |
| 7,146,176 B2* | 12/2006 | McHenry | 455/454 |
| 7,184,703 B1 | 2/2007 | Naden et al. | |
| 7,218,891 B2 | 5/2007 | Periyalwar et al. | |
| 7,336,930 B2* | 2/2008 | Larsson et al. | 455/63.1 |
| 7,386,036 B2 | 6/2008 | Pasanen et al. | |
| 7,398,056 B1 | 7/2008 | Ebert et al. | |
| 7,403,576 B2 | 7/2008 | Lakkis | |
| 7,406,060 B2 | 7/2008 | Periyalwar et al. | |
| 7,406,647 B2 | 7/2008 | Lakkis | |
| 7,430,397 B2* | 9/2008 | Suda et al. | 455/7 |
| 7,433,708 B2 | 10/2008 | Rinne et al. | |
| 7,450,637 B2 | 11/2008 | Lakkis | |
| 7,460,609 B2 | 12/2008 | Tirkkonen et al. | |
| 7,463,673 B2 | 12/2008 | Fujii et al. | |
| 7,464,166 B2* | 12/2008 | Larsson et al. | 709/228 |
| 7,519,323 B2* | 4/2009 | Mohebbi | 455/11.1 |
| 7,545,765 B2* | 6/2009 | Larsson et al. | 370/328 |
| 7,545,778 B2* | 6/2009 | Sugar et al. | 370/335 |
| 7,573,813 B2* | 8/2009 | Melnik | 370/221 |
| 7,583,619 B2* | 9/2009 | Edwards | 370/279 |
| 7,606,531 B2* | 10/2009 | Asai et al. | 455/11.1 |
| 7,630,355 B2* | 12/2009 | Tao et al. | 370/343 |
| 7,630,501 B2* | 12/2009 | Blank et al. | 381/58 |
| 7,733,220 B2* | 6/2010 | Libby | 340/539.1 |
| 7,764,967 B2* | 7/2010 | Kim et al. | 455/450 |
| 7,782,750 B2* | 8/2010 | Yamaura et al. | 370/206 |
| 7,907,540 B2* | 3/2011 | Li et al. | 370/252 |
| 7,920,501 B2* | 4/2011 | Larsson et al. | 370/315 |
| 7,933,551 B2* | 4/2011 | Shibouta | 455/11.1 |
| 7,952,988 B2* | 5/2011 | Lee et al. | 370/208 |
| 7,957,257 B2* | 6/2011 | Zhou et al. | 370/204 |
| 7,965,618 B2* | 6/2011 | Zhou et al. | 370/203 |
| 7,969,940 B2* | 6/2011 | Kim et al. | 370/329 |
| 7,970,347 B2* | 6/2011 | Hart et al. | 455/13.1 |
| 7,983,151 B2* | 7/2011 | Hart et al. | 370/218 |
| 7,983,613 B2* | 7/2011 | Rappaport | 455/11.1 |
| 8,023,524 B2* | 9/2011 | Doppler et al. | 370/431 |
| 8,040,826 B2* | 10/2011 | Lee et al. | 370/293 |
| 8,045,991 B2* | 10/2011 | Cho et al. | 455/450 |
| 8,085,652 B2* | 12/2011 | Hart et al. | 370/203 |
| 8,090,061 B1* | 1/2012 | Zhang | 375/345 |
| 8,095,099 B2* | 1/2012 | Patel et al. | 455/183.1 |
| 8,116,254 B2* | 2/2012 | Sabat et al. | 370/318 |
| 8,125,938 B2* | 2/2012 | Nystrom et al. | 370/315 |
| 8,130,693 B2* | 3/2012 | Miller et al. | 370/316 |
| 8,140,011 B2* | 3/2012 | Kawakami et al. | 455/41.1 |
| 8,149,879 B2* | 4/2012 | Rogerson et al. | 370/478 |
| 8,175,024 B2* | 5/2012 | Saifullah et al. | 370/315 |
| 8,213,356 B2* | 7/2012 | Hart et al. | 370/328 |
| 8,238,299 B2* | 8/2012 | Lee et al. | 370/329 |
| 8,244,266 B2* | 8/2012 | Song et al. | 455/452.1 |
| 8,347,361 B2* | 1/2013 | Larsen | 726/4 |
| 8,380,123 B2* | 2/2013 | Jang | 455/7 |
| 2003/0124976 A1* | 7/2003 | Tamaki et al. | 455/15 |
| 2004/0062551 A1* | 4/2004 | ElBatt et al. | 398/115 |
| 2004/0205105 A1* | 10/2004 | Larsson et al. | 709/200 |
| 2004/0217881 A1* | 11/2004 | Pedyash et al. | 340/870.07 |
| 2004/0233918 A1* | 11/2004 | Larsson et al. | 370/400 |
| 2005/0058151 A1* | 3/2005 | Yeh | 370/445 |
| 2005/0059342 A1* | 3/2005 | Engels et al. | 455/7 |
| 2005/0117526 A1* | 6/2005 | Melnik | 370/254 |
| 2005/0130587 A1* | 6/2005 | Suda et al. | 455/9 |
| 2006/0003697 A1* | 1/2006 | Asai et al. | 455/11.1 |
| 2006/0146746 A1* | 7/2006 | Kim | 370/328 |
| 2006/0229017 A1* | 10/2006 | Larsson et al. | 455/63.1 |
| 2006/0285505 A1* | 12/2006 | Cho et al. | 370/254 |
| 2006/0286986 A1* | 12/2006 | Kim et al. | 455/450 |
| 2007/0081483 A1* | 4/2007 | Jang et al. | 370/315 |
| 2007/0109962 A1* | 5/2007 | Leng et al. | 370/229 |
| 2007/0123292 A1* | 5/2007 | Kang et al. | 455/525 |
| 2007/0133388 A1* | 6/2007 | Lee et al. | 370/206 |
| 2007/0165581 A1 | 7/2007 | Mehta et al. | |
| 2007/0190967 A1* | 8/2007 | Cho et al. | 455/403 |
| 2007/0275669 A1* | 11/2007 | Rietman et al. | 455/70 |
| 2008/0002601 A1* | 1/2008 | Coronel et al. | 370/315 |
| 2008/0107063 A1* | 5/2008 | Oleszczuk | 370/315 |
| 2008/0107073 A1* | 5/2008 | Hart et al. | 370/330 |
| 2008/0108355 A1* | 5/2008 | Oleszczuk | 455/442 |
| 2008/0130685 A1* | 6/2008 | Rogerson et al. | 370/478 |
| 2008/0144493 A1* | 6/2008 | Yeh | 370/230 |
| 2008/0144552 A1* | 6/2008 | Johansson et al. | 370/310 |
| 2008/0165670 A1* | 7/2008 | Tao et al. | 370/203 |
| 2008/0165720 A1* | 7/2008 | Hu et al. | 370/315 |
| 2008/0232296 A1 | 9/2008 | Shin et al. | |
| 2008/0274745 A1 | 11/2008 | Barak et al. | |
| 2008/0285500 A1* | 11/2008 | Zhang et al. | 370/315 |
| 2008/0293358 A1 | 11/2008 | Andersson et al. | |
| 2009/0034448 A1* | 2/2009 | Miller et al. | 370/316 |
| 2009/0070841 A1* | 3/2009 | Buga et al. | 725/116 |
| 2009/0074088 A1* | 3/2009 | Tao et al. | 375/260 |
| 2009/0092073 A1* | 4/2009 | Doppler et al. | 370/315 |
| 2009/0122744 A1* | 5/2009 | Maltsev et al. | 370/315 |
| 2009/0135778 A1* | 5/2009 | Lee et al. | 370/329 |
| 2009/0175238 A1* | 7/2009 | Jetcheva et al. | 370/329 |
| 2009/0185479 A1* | 7/2009 | Hart et al. | 370/218 |
| 2009/0190522 A1* | 7/2009 | Horn et al. | 370/315 |
| 2009/0204831 A1* | 8/2009 | Cousson et al. | 713/322 |
| 2009/0239486 A1* | 9/2009 | Sugar et al. | 455/101 |
| 2009/0245164 A1* | 10/2009 | Lu | 370/315 |
| 2009/0253429 A1* | 10/2009 | Lee et al. | 455/434 |
| 2009/0265550 A1* | 10/2009 | Bahr et al. | 713/168 |
| 2009/0268662 A1* | 10/2009 | Larsson et al. | 370/328 |
| 2009/0290494 A1* | 11/2009 | Govindan et al. | 370/238 |
| 2009/0325482 A1* | 12/2009 | Zhou et al. | 455/25 |
| 2010/0002619 A1* | 1/2010 | Hart et al. | 370/315 |
| 2010/0042831 A1* | 2/2010 | Bahr et al. | 713/160 |
| 2010/0085934 A1* | 4/2010 | Wang et al. | 370/330 |
| 2010/0120361 A1* | 5/2010 | Rappaport | 455/18 |
| 2010/0135195 A1* | 6/2010 | Sakoda | 370/311 |
| 2010/0151793 A1* | 6/2010 | Wang et al. | 455/67.11 |
| 2010/0151865 A1* | 6/2010 | Camp et al. | 455/445 |
| 2010/0165893 A1* | 7/2010 | Edwards | 370/280 |
| 2010/0177807 A1* | 7/2010 | Zhang | 375/211 |
| 2010/0214964 A1* | 8/2010 | Larsson et al. | 370/277 |
| 2010/0232345 A1* | 9/2010 | Tsai et al. | 370/315 |
| 2010/0260096 A1* | 10/2010 | Ulupinar et al. | 370/315 |
| 2010/0278152 A1* | 11/2010 | Andreozzi et al. | 370/335 |
| 2010/0284446 A1* | 11/2010 | Mu et al. | 375/211 |
| 2010/0298015 A1* | 11/2010 | Medbo et al. | 455/501 |
| 2011/0026575 A1* | 2/2011 | Shalom et al. | 375/227 |
| 2011/0038284 A1* | 2/2011 | Senarath et al. | 370/279 |
| 2011/0110261 A1* | 5/2011 | Frenger | 370/252 |
| 2011/0125905 A1* | 5/2011 | Baucke et al. | 709/226 |
| 2011/0256826 A1* | 10/2011 | Ode et al. | 455/7 |
| 2011/0292863 A1* | 12/2011 | Braz et al. | 370/315 |
| 2012/0057456 A1* | 3/2012 | Bogatin et al. | 370/230.1 |

OTHER PUBLICATIONS

Author Unknown. "Reconfigurable OFDMA-based Cooperative NetworKs Enabled by Agile SpecTrum Use." D6,ICT-215282 STP ROCKET. Publication date unknown. Available at: http://ict-rocket.eu/documents/Deliverables/rocket_2D1RWTg3.pdf.

Schoenen, R. et al. "An FDD Multihop Cellular Network for 3GPP-LTE." IEEE Vehicular Technology Conference, 2008 (VTC Spring 2008), Singapore, May 11-14, 2008, pp. 1990-1994.

Tse, D. "Breaking the Interference Barrier." Mobicom/Mobihoc Plenary Talk, Sep. 13, 2007. Available at: www.eecs.berkeley.edu/~dtse/mobicom_plenary.ppt.

Maltsev, A. et al. "Relay Frequency Reuse Scheme." IEEE C802.16m-09/0462r1, IEEE 802.16 Broadband Wireless Access Working Group, Mar. 6, 2009.

Bain, Y. Q. et al. "High Efficient Mobile WiMAX with MIMO and Multihop Relay." Journal of Communications, vol. 2, No. 5, Aug. 2007, pp. 7-15.

Rizvi, K. et al. "Fractional Frequency Reuse for IEEE802.16j Relaying Mode." IEEE C80216j-06_223, IEEE 802.16 Multihop Relay Project, Nov. 7, 2006.

Wang, L. et al. "Performance Improvement through Relay-Channel Partitioning and Reuse in OFDMA Multihop Cellular Networks." International Wireless Communications and Mobile Computing Conference, 2008 (IWCMC '08), Crete Island, Aug. 6-8, 2008, pp. 177-182.

* cited by examiner

METHOD AND APPARATUS FOR MIMO REPEATER CHAINS IN A WIRELESS COMMUNICATION NETWORK

RELATED APPLICATIONS

This application claims priority from the U.S. provisional patent application filed on 6 May 2009 and identified by Application No. 61/176,088, and which is incorporated herein by reference.

FIELD OF THE INVENTION

The present invention generally relates to wireless communication networks, and particularly relates to the use of repeater chains in MIMO-based wireless communication networks.

BACKGROUND

The growing need for high data rate multi-media communications requires wideband wireless communication systems. This requirement translates into the need for occupying a much wider spectrum and using more power to deliver high-rate information between a base station (BS) and user equipment (UE), such as a mobile terminal. However, portable devices, with their battery power and low build costs, generally are not well suited for transmitting wideband signals at high power. Further, while base stations are not considered power limited in the same sense as mobile terminals, excessive power consumption at base stations is nonetheless undesirable. And, beyond that, the variation in channel conditions throughout a given base station's service area generally means that one or more areas are hard for the base station to transmit into, at least at the high signal qualities needed for the higher data rates.

Relay stations, which are also referred to as repeaters, address at least some of these problems, and they represent an area of rapidly growing interest. In one contemplated approach, the insertion of repeaters into a base station cell provides improved coverage for high bit-rate services. The LTE and LTE Advanced standards involve high data rates, e.g., the LTE downlink may achieve 100 Mbps or higher, and the LTE Advanced downlink may achieve 1 Gbps or higher. Without repeaters, it may not be possible for a mobile terminal or other item of user equipment to transmit such signals to a supporting base station, and vice versa.

Known repeaters separate into various categories, based on core aspects of repeater structure and operation. For example, there are regenerative and non-regenerative repeaters. Broadly, a regenerative repeater receives a signal, reconstructs it, and transmits the reconstructed signal. Such reconstruction enables the signal to be repeated over multiple hops—over several repeaters, for example—without significant degeneration. Non-regenerative repeaters, on the other hand, simply repeat the received signal.

Other distinctions relate to reception and transmission frequencies. A frequency-translating repeater repeats the received signal, but does so at a different frequency. That is, the received signal is translated into a different frequency (or frequencies) for transmission. One advantage of this arrangement is the elimination (or significant reduction) of input-to-output leakage. Repeaters operating on the same receive/transmit frequency rely on input-to-output isolation to prevent undesired transmit/receive coupling, which can cause repeater instability.

However, while frequency translation provides for good input-to-output isolation, it complicates or prevents in-band channel signaling between a base station and its repeater-supported user equipment. As such, frequency translation generally is not compatible with the existing communication standards between base stations and user equipment, such as GSM/WCDMA/LTE, etc.

In general, however, known relay systems include multi-hop MIMO relays, for use in extending high-rate service in advanced wireless systems, such as LTE Advanced. In this context, both regenerative and non-regenerative relays are known. Further, to a limited extent, some types of frequency translation appear to be known, such as where a MIMO OFDM relay maps the information received on one OFDM subcarrier/symbol time, into another OFDM subcarrier/symbol time, where "OFDM" denotes Orthogonal Frequency Division Multiplexing.

See, for example, U.S. Pat. No. 7,184,703 B1, which discloses MIMO relay stations that appear to use signal SNR evaluations to determine which uplink/downlink signals will be relayed. In one or more embodiments, the relays use regenerative transmission, with the possibility of in-band frequency translations. Further, see U.S. Pat. No. 7,218,891 B2, which discloses relays that use in-band transmissions, with a focus on coordinated rate and power control, to allow simultaneous transmissions between a base station and user equipment, and between a relay and user equipment.

Still further, the reader may refer to U.S. Pat. No. 7,386,036 B2 for an example of link optimization between MIMO relay stations and users that is done separately from the optimization of relay-to-base-station links. And U.S. Pat. No. 7,406,060 B2 discloses MIMO relay stations, where communication channels between the relays allow them to operate with Space Time Transmit Diversity (STTD), or with Space Time Block Coding (STBC).

Finally, see Fizvi, Sun, et al., "Fractional Frequency Reuse for IEEE820.16j Relaying Mode," submitted as Paper No. IEEE C80216j-06__223 to the IEEE 802.16 Multihop Relay Project (2006-11-07). This paper discloses a fractional frequency reuse ("FFR") scheme, wherein a full load frequency reuse of one is maintained for (cell) center users, while FFR is used for (cell) edge users, to improve edge user connection quality. In other words, in this context, cell edge users operate with a fraction of the available sub-channels, based on a relay between the base station and the cell edge users relaying only a portion of the frequencies in use.

SUMMARY

In one or more embodiments taught herein, a multi-band MIMO repeater is configured to translate normal wireless mobile bands into other frequency bands in the physical layer. An advantageous, multi-hop repeater chain includes two or more such repeaters for propagating downlink signals from a base station, and propagating uplink signals to the base station. Each such repeater may use paralleled homodyne structure transceivers for better SNR, spectrum combiners for uplink signal aggregation, spectrum separators for downlink signal de-aggregation, water mark signal inserters for optimization, and, among other things, spectrum analyzers for frequency band selection. In at least one such embodiment, a multi-hop repeater chain is configured for MIMO operation in an LTE Advanced or other MIMO network, to deliver high data rate over larger distances—e.g., further away from cell base stations. One or more such embodiments combine MIMO operation with Orthogonal Frequency Division Multiplexing (OFDM) operation, e.g., at least on the downlink.

Broadly, in at least one embodiment, a multi-hop repeater chain is configured for use with a wireless base station in a wireless communication network. The multi-hop repeater chain is configured to de-aggregate downlink signals as they are propagated outward from the base station to mobile terminals along the multi-hop repeater chain, and to aggregate uplink signals as they are propagated inward from mobile terminals along the multi-hop repeater chain to the base station.

In this context, "de-aggregating" the downlink signals means that each repeater relays to the next downstream repeater those downlink signals targeted to mobile terminals indirectly supported by the repeater, and (locally) repeats those downlink signals targeted to mobile terminals directly supported by the repeater. In the same sense, "aggregating" uplink signals means that each repeater relays to the next upstream repeater a combination of the uplink signals received by the repeater from the mobile terminals directly supported by the repeater, and the uplink signals relayed to the repeater from the next downstream repeater, for the mobile terminals indirectly supported by the repeater. As exceptions, the last repeater does not have a next downstream repeater, and the first repeater does not have a next upstream repeater.

Notably, the repeaters in the multi-hop repeater chain are each configured to conduct repeater-to-mobile-terminal transmissions and mobile-terminal-to-repeater receptions using a base station frequency spectrum. That is, each repeater uses the base station frequency spectrum—the base station's downlink and uplink—to transmit to and receive from the mobile terminals directly supported by the repeater.

According to the terminology herein, the terms "repeat," "repeating," "repeated," etc., refer to a given relay transmitting downlink signals in the base station frequency spectrum, for mobile terminal reception, or, as is done in some embodiments, to the first relay in the chain transmitting uplink signals in the base station frequency domain, for base station reception. More broadly, "repeating" relates to signaling in the base station frequency spectrum. Conversely, the terms "relay," "relaying," "relayed," etc., refer to transmissions between repeaters (uplink and downlink), which are conducted in the repeater frequency domain, and thus are not intended for reception by mobile terminals. Thus, "relaying" as used herein broadly relates to signaling in the repeater frequency spectrum.

In at least one embodiment, the multi-hop repeater chain described above comprises one in a plurality of like multi-hop repeater chains, each configured in a corresponding one in a plurality of neighboring cells in a wireless communication network. The multi-hop repeater chains are configured to use different patterns of base station frequency spectrum assignments for repeater-supported mobile terminals. As such, the repeater or repeaters closest to a cell edge in a given one of the cells communicate with mobile terminals using different portions of the base station frequency spectrum than are used by the repeaters closest to cell edges in adjacent ones of the neighboring cells. For example, the last repeater in a multi-hop repeater chain within a given cell is configured to use a different portion of the base station frequency spectrum than used by the last repeaters in the chains disposed in the adjacent cells.

Another embodiment taught herein provides a method of repeater-based communications in a cell within a wireless communication network. The method comprises de-aggregating downlink signals as they are propagated outward along the multi-hop repeater chain from a base station in the cell, and aggregating uplink signals as they are propagated inward along the multi-hop repeater chain to the base station. Here, de-aggregating comprises each but the last repeater relaying to a next repeater those downlink signals that are targeted to mobile stations indirectly supported by the repeater, and each repeater repeating those downlink signals that are targeted to mobile terminals directly supported by the repeater.

Similarly, aggregating by the multi-hop repeater chain comprises each but the first repeater relaying to the next upstream repeater those uplink signals received from mobile stations directly supported by the repeater, each but the last repeater further relaying those uplink signals received from the next downstream repeater, and the first repeater repeating to the base station those uplink signals received from the next downstream repeater and those uplink signals received from the mobile terminals directly supported by the first repeater. As previously noted, each repeater "relays" in a repeater frequency spectrum and "repeats" in a base station frequency spectrum. Note, however, that the first repeater may be separate from the controlling base station, or integrated with the controlling base station, and the specifics of downlink and uplink transmissions between the base station and the first repeater are configured accordingly—e.g., over-the-air radio signal propagations versus direct or localized RF connections.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
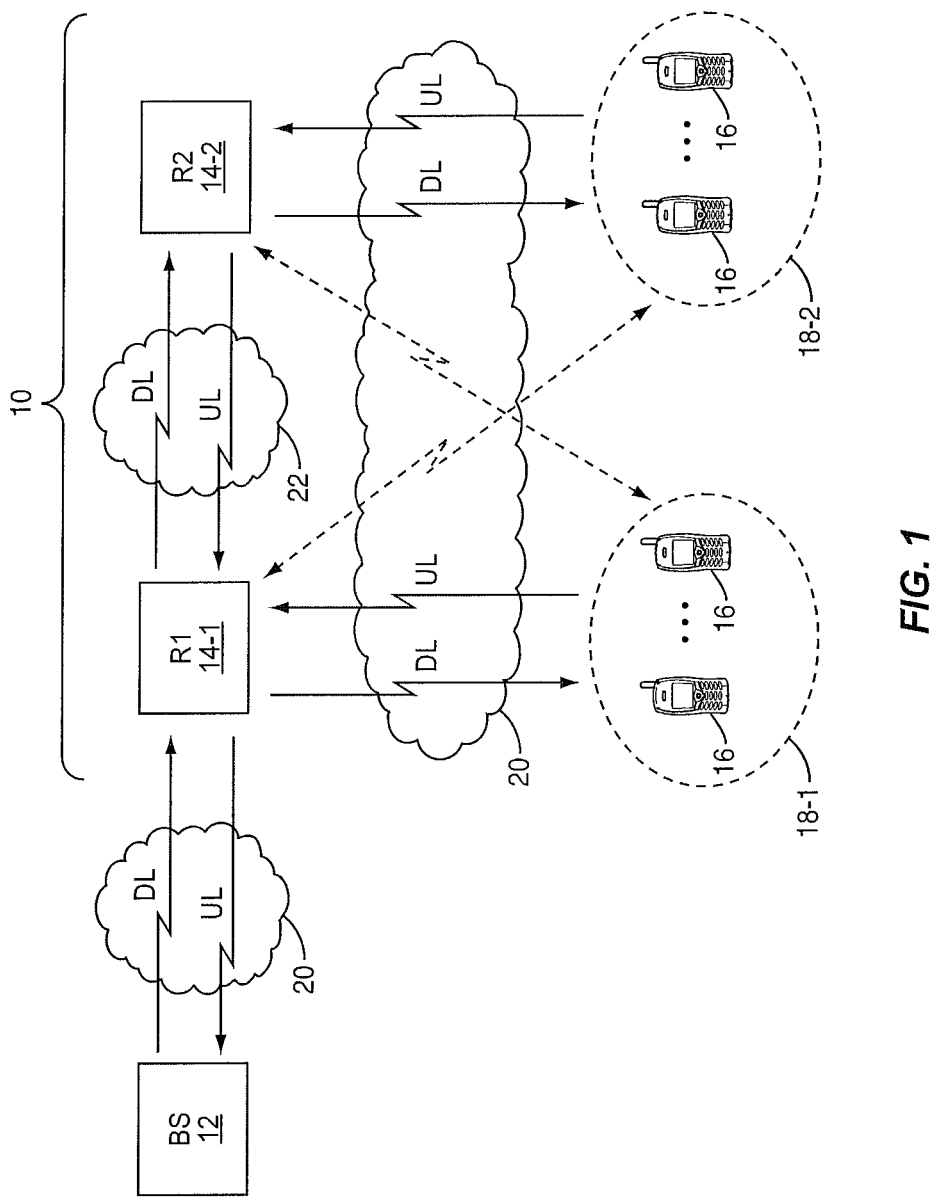
FIG. 1 is a block diagram of one embodiment of a repeater chain, including two or more repeaters, shown with an associated, controlling base station.

FIG. 1 illustrates one embodiment of a multi-hop repeater chain 10 for use with a wireless base station 12 in a wireless communication network (not explicitly shown). The multi-hop repeater chain 10 includes two or more repeaters 14. For this discussion, "repeaters 14" is used to refer to the overall set of repeaters 14 in the (multi-hop) repeater chain 10, and "repeater 14" is used to refer generically to any given one of those repeaters 14. Where needed for clarity, the discussion makes use of suffixes to differentiate between repeaters 14. Thus, the diagram depicts two repeaters 14 in the chain, denoted as 14-1 and 14-2.

In operation, the repeater chain 10 de-aggregates downlink signals as they are propagated outward from the base station 12 to mobile terminals 16 along the repeater chain 10. Similarly, the repeater chain 10 aggregates uplink signals as they are propagated inward from mobile terminals 16 along the repeater chain 10 to the base station 12. With this arrangement, each repeater 14 supports a given group 18 of mobile terminals 16. For example, the repeaters 14 may report receiver signal strengths (uplink and/or downlink) to the base station 12, and the base station 12 may assign given mobile terminals 16 to given ones of the repeaters 14, based on signal strengths, loading, etc. Of course, such groupings may be changed dynamically, as a function of changing reception conditions, resource loading, mobile terminal mobility, etc.

In any case, the diagram depicts the repeater 14-1 as directly supporting a first group 18-1 of mobile terminals 16, and depicts the repeater 14-2 as directly supporting a second group 18-2 of mobile terminals 16. As the repeater 14-1 is "upstream" from the repeater 14-2, in terms of repeater positions within the repeater chain 10, it will be appreciated that the repeater 14-1 indirectly supports the mobile terminals 16 in the group 18-2, in the sense that downlink signals targeted to the mobile terminals 16 in the group 18-2 are relayed to the repeater 14-2 through the repeater 14-1.

Similarly, uplink signals transmitted by the mobile terminals 16 in the group 18-2 are received by the repeater 14-2, and relayed (via repeater-to-repeater transmission) to the repeater 14-1, which repeats them to the base station 12. Thus, as used herein, a given repeater 14 in the chain 10 is regarded as directly supporting those mobile terminals 16 currently in its associated group 18, and is regarded as indirectly supporting all mobile terminals 16 that are directly supported by repeaters 14 that are downstream (i.e., further along) in the repeater chain 10.

Notably, each repeater 14 repeats downlink signals to its directly-supported mobile terminals 16 using a base station frequency spectrum 20. Likewise, each repeater 14 receives uplink signal transmissions in the base station frequency spectrum 20 from its directly-supported mobile terminals 16. However, for repeater-to-repeater relay transmissions, each repeater 14 uses a repeater frequency spectrum 22. Here, the "base station frequency spectrum 20" is the collection of base station downlink and uplink frequencies, as defined by the particular air interface adopted by the base station 12 and mobile terminals 16.

As such, the repeater frequency spectrum 22—which, like the base station frequency spectrum 20, may be contiguous or non-contiguous—is outside of the base station frequency spectrum 20. As such, inter-repeater communications (i.e., relaying) do not interfere with downlink and uplink signals transmitted in the base station frequency spectrum 20. Again, according to the terminology herein, transmitting in the repeater frequency spectrum 22 from one repeater 14 to another repeater 14 is referred to as "relaying." Conversely, transmitting in the base station frequency spectrum 20 from a given repeater 14 to its directly supported mobile terminals 16 is referred to as "repeating." Likewise, in embodiments where the first repeater 14 in the chain 10 is not co-located with the base station 12, the first repeater 14 can be understood as repeating in the base station frequency spectrum 20 all uplink signals collected (aggregated) from the downstream repeaters 14, along with those uplink signals from its directly supported mobile terminals 16.

Accordingly, as a further example, a first repeater 14 in a multi-hop repeater chain 10 receives aggregated downlink signals from the base station 12, which include downlink signals for all mobile terminals 16 supported by the overall chain 10. The first repeater 14 repeats (using the base station frequency spectrum 20) those particular downlink signals targeted to any mobile terminals 16 that are directly supported by the first repeater 14. Conversely, the first repeater 14 relays to the next repeater 14 in the chain 10 those downlink signals that are targeted to mobile terminals 16 supported by the next or any subsequent repeater 14 in the chain 10. These "downstream" mobile terminals thus may be regarded as being indirectly supported mobile terminals, from the perspective of the first repeater 14.

In turn, each subsequent repeater 14 along the chain 10 can be understood as receiving relayed downlink signals, some of which may be targeted to its directly supported mobile terminals 16 and some of which may be targeted to its indirectly supported mobile terminals 16, if any. As such, each such repeater 14 repeats in the base station frequency spectrum 20 those downlink signals targeted to its directly supported mobile terminals 16, and relays in the repeater frequency spectrum 22 those downlink signals targeted to its indirectly supported mobile terminals 16.

Also, note that the diagonal dashed line from the repeater 14-1 to the mobile terminal group 18-2 (and from the repeater 14-2 to the mobile terminal group 18-1) indicates that the repeater chain 10 can be configured for diversity transmission to one or more mobile terminals 16. For example, one or more of the mobile terminals 16 in the group 18-2 may have communication links to both repeaters 14-1 and 14-2 and/or one or more of the mobile terminals 16 in the group 18-1 may have communication links to both repeaters 14-1 and 14-2. These diversity connection capabilities reduce the need for accurately locating given mobile terminals 16 with respect to repeaters 14 in the chain 10, and provide for the possibility of improved communication performance through diversity-enhanced reception.

Figure 2:
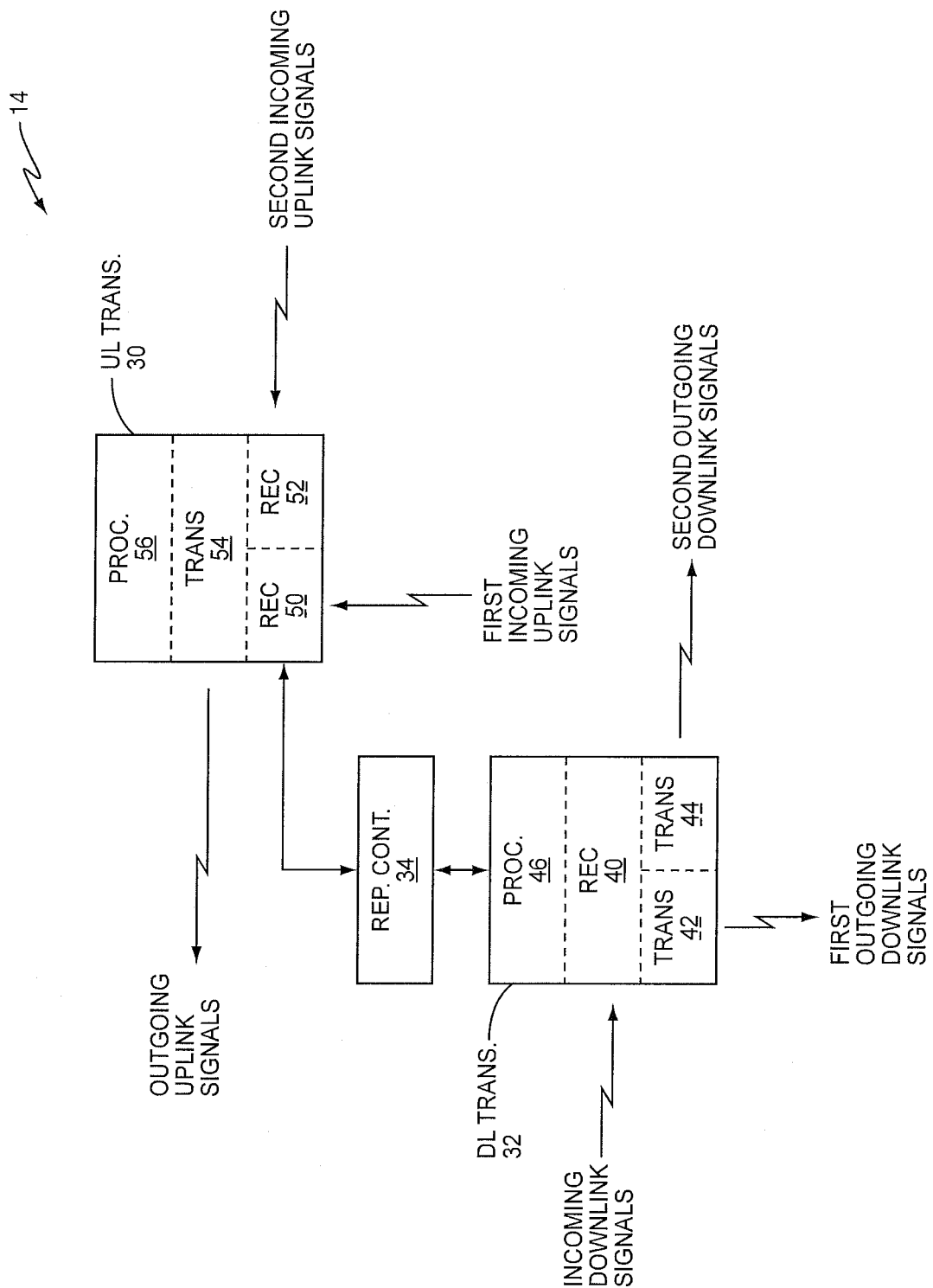
FIG. 2 is a block diagram of one embodiment of a repeater, illustrating example uplink and downlink transceivers.

In any case, with the above aggregation/de-aggregation and frequency-translation functions in mind, FIG. 2 illustrates that each repeater 14 comprises an uplink transceiver 30, a downlink transceiver 32, and a repeater controller 34. The uplink and downlink transceivers 30 and 32 are configured to conduct repeater-to-mobile-terminal transmissions and mobile-terminal-to-repeater receptions using the base station frequency spectrum 20, and to conduct repeater-to-repeater transmissions and receptions using the repeater frequency spectrum 22. (Note that FIG. 2 does not explicitly depict receive/transmit antennas, but those skilled in the art will appreciate that the transceivers 30 and 32 include or are associated with one or more antennas. Further, note that in at least one embodiment, one or more repeaters 14 in the repeater chain 10 include beam forming circuits and antenna elements, for point-to-point communications with a next repeater, or with the wireless base station. Thus, one or both of the transceivers 30 and 32 may be configured for beam forming.)

As an example of Multiple-Input-Multiple-Output (MIMO) embodiments of the repeaters 14, each transceiver 30 and 32 includes multiple receive antennas and multiple transmit antennas in the relaying paths, as well as in the repeating paths. In at least one such embodiment, each repeater 14 comprises a MIMO Orthogonal Frequency Division Multiplex (OFDM) repeater. In the same or other embodiments, each repeater 14 in the chain 10 comprises a "Layer 1" repeater. Further, in the same or another embodiment, the chain 10 includes two or more repeaters 14 operating in a parallel, diversity-transmission mode for at least one of downlink signal repeating and uplink signal repeating. See FIG. 3 for an example of a diversity-configured chain 10 of repeaters 14.

Regardless, as a non-limiting operating advantage provided by one or more embodiments of the repeater chain 10 taught herein, each repeater 14 is configured to limit its usage of the base station frequency spectrum 20, according to base station frequency spectrum assignments of those mobile terminals 16 directly supported by the repeater 14. Doing so offers the advantages of consuming less power at the repeater 14 and causing less system interference (as compared to repeating over the whole base station frequency spectrum 20).

In OFDM and other embodiments of the base-station/repeater chain contemplated herein, a mobile terminal 16 can be configured to communicate with the base station 12 directly, with one repeater 14 or multiple repeaters 14, or with one or more repeaters 14 and the base station 12. The multi-path communication between a mobile terminal 16 and a group of repeaters 14 as well as base station 12, can improve the SNR or data-rate. In one such embodiment, a multi-hop repeater chain 10 provides for improved SNRs by virtue of being configured to support concurrent multipath communications between a given mobile terminal 16 and (a) two or more repeaters 14 in the multi-hop repeater chain 10, each such repeater sending to or receiving from the mobile terminal 16 in the base station frequency spectrum, or (b) at least one repeater 14 in the multi-hop repeater chain 10 and the base station 12, where the repeater 14 and the base station 12 each send to or receive from the mobile terminal 16 in the base station frequency spectrum.

As for the repeater controller 34 illustrated in FIG. 2, in one or more embodiments, it is configured to control communication frequencies of the repeater 14 in which it is included, responsive to receiving configuration messages from a master repeater in the repeater chain 10, or from the base station 12. Those skilled in the art will appreciate that the repeater controller 34 comprises, in at least one embodiment, one or more microprocessor-based circuits (including memory or other supporting storage). Configuration of the repeater controller 34 in such embodiments is based on, for example, the particular computer program instructions stored in the repeater 14 and executed by the repeater controller 34.

Communication frequencies of interest at each given repeater 14 include the particular base station frequency assignments (taken individually, or taken in group or band-wise within the overall base station frequency spectrum 20). Further, in at least one embodiment, the communication frequencies of interest include the particular bands or sub-bands within the repeater frequency spectrum 22 that are used by a given repeater 14, and by the immediate upstream and downstream repeaters 14 (if any) that relay to the given repeater 14. Frequency control/selectivity at each repeater 14 supports the de-aggregation of downlink signals propagated along the repeater chain 10, as well as the aggregation of uplink signals propagated along the repeater chain 10.

Referring still to the example of FIG. 2, the repeater chain 10 de-aggregates downlink signals as they are propagated outward along the repeater chain 10 by, at each but the last repeater 14, receiving incoming downlink signals and separating them into first outgoing downlink signals, which are repeated to mobile terminals 16 directly supported by the repeater 14, and second outgoing downlink signals, which are targeted to mobile terminals 16 indirectly supported by the repeater 14, and which are relayed to the next downstream repeater 14 in the repeater chain 10.

Conversely, the repeater chain 10 aggregates uplink signals as they are propagated inward along the repeater chain 10 by, at each but the last repeater 14, receiving first incoming uplink signals transmitted from mobile terminals 16 directly supported by the repeater 14, and receiving second incoming uplink signals relayed from the next downstream repeater 14 in the repeater chain 10. The repeater 14 combines the first and second incoming uplink signals into outgoing uplink signals, and repeats the outgoing uplink signals to the base station 12, if the repeater 14 is the first repeater 14, or otherwise relays them to the next upstream repeater 14 in the repeater chain 10.

As an example, an "intermediate" repeater 14 is any repeater 14 in the chain 10 between the first and last repeaters 14. In one or more embodiments, the downlink transceiver 32 in such intermediate repeater 14 is configured to receive incoming downlink signals relayed from the next upstream repeater 14, separate the incoming downlink signals into first outgoing downlink signals, which are targeted to mobile terminals 16 directly supported by the repeater 14, and second outgoing downlink signals, which are targeted to mobile terminals 16 indirectly supported by the repeater 14.

In other words, the downlink transceiver 32 receives downlink signals in the repeater frequency spectrum 22, as relayed by the next upstream repeater 14 in the chain 10, repeats some of those downlink signals (via transmission in the base station frequency spectrum 20), and relays some of them (via transmission in the repeater frequency spectrum) to the next downstream repeater 14 in the chain 10. The incoming downlink signals that are repeated in the base station frequency spectrum 20 are those targeted to the mobile terminals 16 directly supported by the repeater 14, while those that are relayed are the remaining downlink signals, targeted to mobile terminals 16 supported by subsequent repeaters 14 in the chain 10. Such separation may be done in terms of frequency bands, and those skilled in the art will realize that, practically, there may be some overlap between the repeated versus the relayed downlink signals.

In any case, the downlink transceiver 32 repeats the first outgoing downlink signals in the base station frequency spectrum 20, for reception by mobile terminals 16 directly supported by the repeater 14, and relays the second outgoing downlink signals in the repeater frequency spectrum 22, for reception by the next downstream repeater 14 in the repeater chain 10. As such, the downlink transceiver 32 includes a receiver 40, for receiving the incoming downlink signals, a first transmitter 42, for repeating the first outgoing downlink signals, and a second transmitter 44, for relaying the second outgoing downlink signals.

Further, the downlink transceiver 32 includes a spectrum processor 46 that includes an analog or digital baseband filter circuit (not shown). The filter circuit is configurable for separating the incoming downlink signals into the first and second outgoing downlink signals. For example, baseband filtering is configured according to base station frequency spectrum assignments of the mobile terminals 16 directly supported by the repeater 14. In this regard, one or more embodiments contemplated herein cluster or otherwise frequency assignments for the mobile stations 16 in the group 18 that is assigned to a given repeater 14, to facilitate filtering and separating those signals.

Note that the downlink transceiver 32 in a first repeater 14 in a repeater chain 10 may include substantially the same receiver, transmitter, and spectrum processing circuits as described for the intermediate repeater 14. However, it should be appreciated that the receiver 40 in the downlink transceiver 32 of all but the first repeater 14 is configured to receive downlink signals relayed by an immediately preceding repeater 14 in the repeater chain 10. As such, the receiver 40 is (at least operationally) configured to receive downlink signals in the repeater frequency spectrum 22. However, the first repeater 14 receives downlink signals directly from the base station 12. As such, the receiver 40 in the first repeater is configured (at least operationally) to receive downlink signals in the base station frequency spectrum 20. The receiver 40 and/or spectrum processor 46 in each but the first repeater 14 therefore may perform additional frequency translation. Note, too, that the last repeater 14 in the chain 10 generally does not relay downlink signals, as there are no succeeding repeaters 14 in the chain 10. That last repeater 14 can omit the second transmitter 44, or otherwise disable it, if desired.

In a similar approach, in one or more embodiments, the uplink transceiver in each intermediate repeater 14 is configured to receive first incoming uplink signals transmitted from mobile terminals 16 directly supported by the repeater 14 and second incoming uplink signals relayed from the next downstream repeater 14. Further, the uplink transceiver 30 is configured to combine the first and second incoming uplink signals into outgoing uplink signals, for relaying to the next upstream repeater 14 in the repeater chain 10.

In at least one such embodiment, the uplink transceiver 30 includes a first receiver 50, for receiving the first incoming uplink signals, a second receiver 52, for receiving the second incoming uplink signals, and a transmitter 54, for relaying the outgoing uplink signals. Further, the uplink transceiver 30 includes a spectrum processor 56 that includes an analog or digital baseband combining circuit (not shown) that is configurable for combining the first and second incoming uplink signals.

Note that the transmitter 54 in each but the first repeater 14 transmits (relays) uplink signals in the repeater frequency spectrum 22. However, the transmitter 54 in the first repeater 14 repeats uplink signals to the base station 12 in the base station frequency spectrum 20. Thus, there are at least operationally configured differences between the transmitters 54 in the first repeater 14 and in the remaining repeaters 14. Also, the last repeater 14 does not necessarily need the second receiver 52, as it is not receiving uplink signals relayed from any succeeding repeater 14. The second receiver 52 in the last repeater 14 can be omitted, or at least disabled, if desired.

Broadly, in one or more embodiments, each repeater 14 includes a frequency-configurable spectrum processor (e.g., 46 and/or 56) that is dynamically configurable for desired aggregating and de-aggregating operations at the repeater 14. Further, the receiver and transmitter resources at each such repeater 14 are configurable, for the communication signal frequencies of interest (and for the associated shifting, filtering, etc.).

As for repeater-to-repeater communication frequencies, the repeater frequency spectrum 22 may be dynamically or statically divided into bands, such that each repeater 14 transmits in a different band or in the same band but for different locations or directions, for relaying uplink and/or downlink signals. As such, and with reference to FIG. 4, in at least one embodiment, one or more of the repeaters 14 include a spectrum analyzer 60 and an associated repeater controller 62. These items are configured for identifying, according to interference measurements, particular frequency bands within the repeater frequency spectrum 22 to be used by one or more of the repeaters 14, for repeater-to-repeater communications. For example, each repeater 14 includes a spectrum analyzer 60 and an associated controller 62, where the controller 62 is configured to make interference measurements within the repeater frequency spectrum 22, to identify one or more preferred frequency bands in the repeater frequency spectrum 22, for use by the repeater 14 in relaying uplink or downlink signals.

Further, each repeater 14 may include a repeater-to-repeater communications interface 64, for sending/receiving repeater command/control messages. In such embodiments, the controller 62 in each repeater 14 may be configured either to select the preferred frequency bands and report the selected frequency bands to the other repeaters 14 (to avoid relaying conflicts between repeaters), or to report the preferred frequency bands to a master repeater 14. In that latter case, each repeater 14 reports preferred frequency bands to the master repeater, which is configured to reconcile such preferences among the repeaters 14, and the controller in each repeater 14 correspondingly receives frequency band assignments from the master repeater 14.

It is contemplated herein that particular methods of frequency assignment, at least as regards the base station frequency spectrum 20, reduce inter-cell interference in a wireless communication network. For example, in one contemplated embodiment, there is a plurality of repeater chains 10, as described herein, each configured in a corresponding one in a plurality of neighboring cells in a wireless communication network (not shown). The repeater chains 10 are configured to use different patterns of base station frequency spectrum assignments for repeater-supported mobile terminals 16, such that the repeaters 14 close to a cell edge in a given one of the cells communicates with (its) mobile terminals 16 using different portions of the base station frequency spectrum 20 than are used by the repeaters close to cell edges in adjacent ones of the neighboring cells (to communicate with their mobile terminals 16). For example, the last group of repeaters 16 in a repeater chain 10 within a given cell may be configured (statically or dynamically) to use different portions of the base station frequency spectrum 20 than that used by like last repeaters 16 in the repeater chains 10 operating in the adjacent cells. Also, it should be understood that more than one repeater 14 in a chain 10 can be configured to deliver the same signal to a given mobile terminal 16, e.g., several repeaters 14 can deliver the same signal to a mobile terminal 16.

Figure 5:
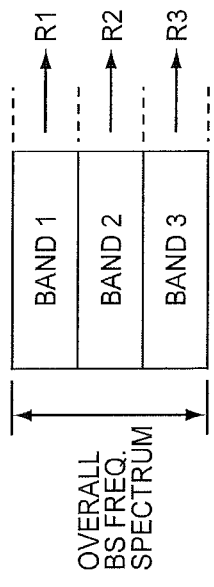
FIG. 5 is a diagram of one example of subdividing the base station frequency spectrum into multiple bands.

The above frequency assignment patterning will be described in further embodiments later herein, however, FIG. 5 illustrates the base station frequency spectrum 20 may be "divided" into multiple bands, e.g., BAND1, BAND2, and BAND3. Assume a three-repeater chain 10, wherein (from first to last) the three repeaters 14 are denoted as R1, R2, and R3. In this case, BAND1 may be assigned to R1, BAND2 to R2, and BAND3 to R3. In a more particular example, the base station 12 is configured with the processing intelligence to assign base station spectrum frequency resources to mobile terminals 16 in such a way that the group 18 of mobile terminals 16 directly supported by each repeater are all assigned resources from within the same band or bands.

Figure 6:
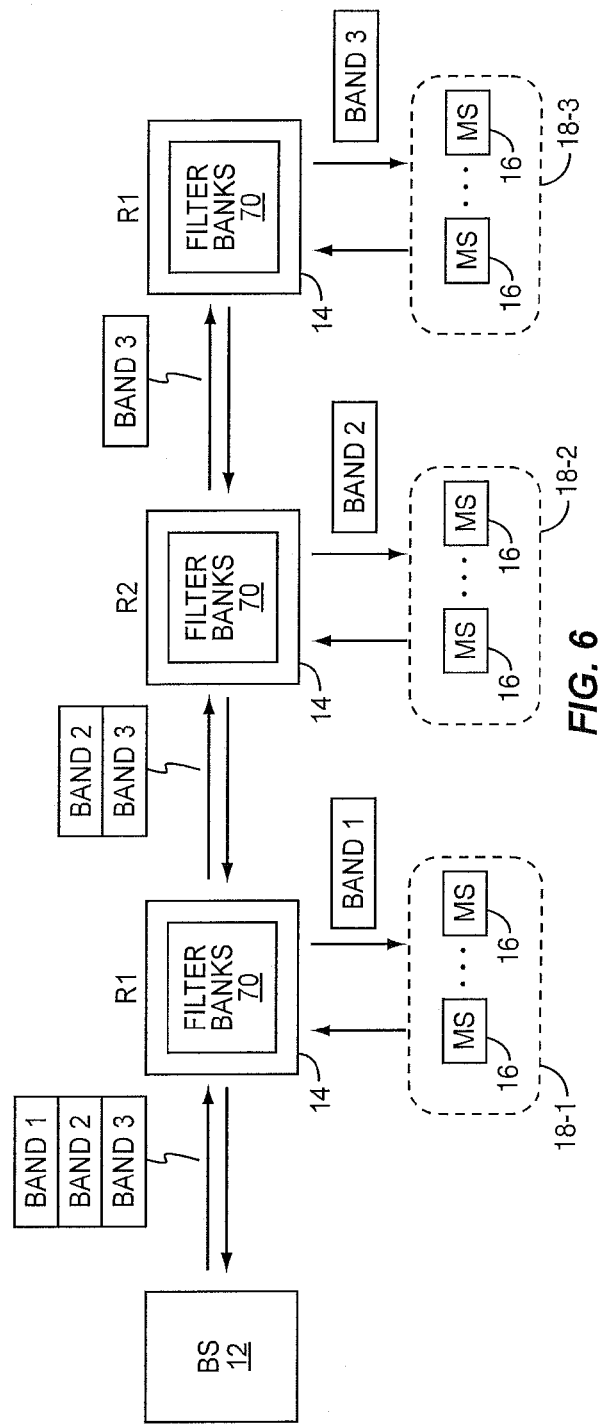
FIG. 6 is a block diagram of one embodiment of a repeater chain, wherein each repeater operates with a different subdivision of the base station frequency spectrum, with respect to those mobile terminals directly supported by the repeater.

See, for example, FIG. 6, which continues the three-band/three-repeater example. One sees that the base station 12 transmits/receives the full spectrum of downlink/uplink signals, across BAND1, BAND2, and BAND3. Thus, R1 receives downlink signals in BAND1, BAND2, and BAND3. R1 repeats the BAND1 downlink signals in the base station frequency spectrum 20, and relays the downlink signals in BAND2 and BAND3 to the next repeater 14 (R2). In doing so, BAND2 and BAND3 are translated or otherwise shifted into the repeater frequency spectrum 22.

In turn, R2 repeats BAND2 in the base station frequency spectrum 20, and relays BAND3 in the repeater frequency spectrum 22. R3 repeats BAND3 in the base station frequency spectrum 20. As noted before, filtering generally is not perfect, there may be some overlap in the band frequencies, and, practically, there may be some retransmission and/or relaying of out-of-band frequencies by one or more of the repeaters 14.

Such band divisions can be used on the downlink and/or the uplink. Broadly, it will be appreciated that repeaters 14 in the repeater chain 10 in one cell can be configured—such as by managing mobile terminal frequency assignments—to repeat in different frequency bands than their counterpart repeaters 14 in another chain 10, in an adjacent cell. In at least one embodiment, usage of the base station spectrum 20 by the repeaters 14 is gradually or incrementally changed along the chain 10, so that the bandwidth of the repeaters 14 become narrower and narrower approaching the cell edge.

Figure 7:
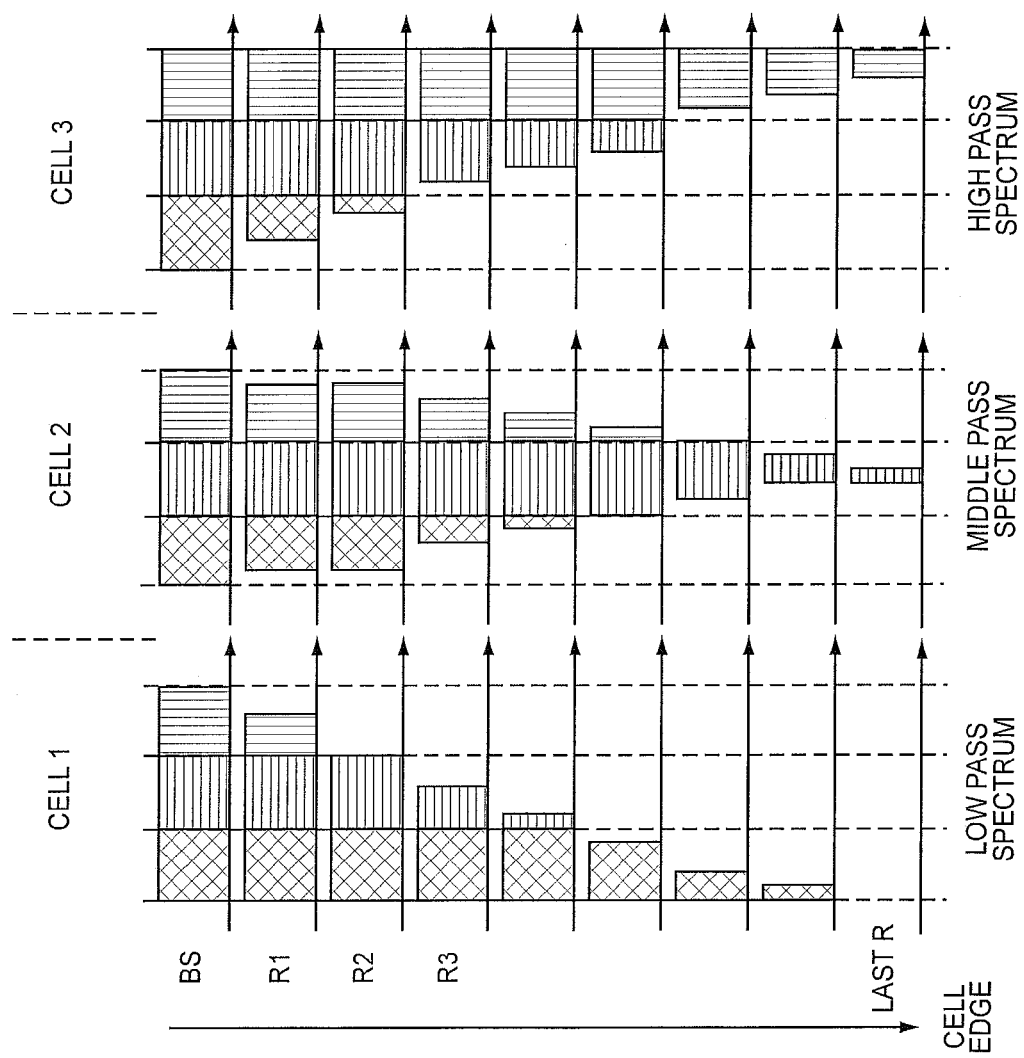
FIG. 7 is a diagram of three cells and the use of low pass, middle pass, and high pass spectrum allocations for repeater chains in adjacent cells, as a form of spectral interleaving to reduce inter-cell interference caused by cell-edge repeaters.

Referring momentarily to FIG. 7, one sees three (neighboring) cells depicted as CELL1, CELL2, and CELL3. Each cell includes a multi-hop repeater chain 10 having repeaters 14 (R1, R2, . . . , Rm). The repeaters 14 can be configured into three groups (one group in each cell). One group, comprising the chain 10 for CELL1, is set for Low Pass Spectrum, and another group (the chain 10 for CELL2) is set for Middle Pass Spectrum, and a third group (the chain 10 for CELL3) is set for High Pass Spectrum. Thus, the repeaters 14 close to the cell edge in one cell will have reduced interference from the cell-edge repeaters 14 in the other cells. Of course, the cells can be configured into r groups, where r is an integer larger or equal to three, to reduce the interference. That is, the inter-cell interference reduction patterns of spectral usage by repeater chains 10 in neighboring cells can encompass two, three, or a larger number of cells, and such patterning can be repeated within even larger groups of cells.

Thus, one or more embodiments taught herein provide a method of reducing inter-cell interference between neighboring cells in a wireless communication network, each cell including a base station 12 and a chain 10 of two or more repeaters 14. The method comprising dividing a base station frequency spectrum 20 among the repeaters 14 in each cell, so that each repeater 14 operates with respect to its supported mobile terminals 16 on a different portion of the base station frequency spectrum 20, and using a different division of the base station spectrum 20 between two neighboring cells, so that a last, cell-edge repeater 14 in the repeater chain 10 of one neighboring cell operates in a different portion of the base station frequency spectrum 20 than does a last, cell-edge repeater 14 in the other neighboring cell(s).

Accordingly, the method further includes allocating frequency resources to repeater-supported mobile terminals 16 operating within each cell in accordance with the portion of the base station frequency spectrum 20 used by their supporting repeaters 16. With this arrangement, each repeater chain 10 provides for propagating downlink signals from the base station 12 along the repeater chain 10, at least as far as needed to reach the repeater-supported mobile terminals 16 targeted by those downlink signals. Further, the method provides for propagating uplink signals from repeater-supported mobile terminals 16 along the repeater chain 10, back to the base station 12, based on repeater-to-repeater transmissions conducted in a repeater frequency spectrum 22, which is different than the base station frequency spectrum 20.

For any given cell, propagating downlink signals from the base station 12 along the repeater chain 10 at least as far as needed to reach the repeater-supported mobile terminals 16 targeted by those downlink signals comprises each intermediate repeater 14 in the chain 10 receiving downlink signals from a preceding repeater in the chain 10, and repeating for reception by its directly supported mobile terminals 16 that portion of the received downlink signals corresponding to that portion of the base station frequency spectrum 20 in which the repeater 14 operates, and further propagating (relaying) at least the remaining portion of the received downlink signals on to a succeeding repeater 14 in the chain 10.

In at least one such embodiment, propagating uplink signals from the repeater-supported mobile terminals 16 along the repeater chain 10 back to the base station 12 comprises each intermediate repeater 14 in the chain 10 receiving uplink signals from its directly supported mobile terminals 16 and from a succeeding repeater 14 in the chain 10, combining those uplink signals and propagating them to a preceding repeater 14 in the chain 10. Further, one or more such embodiments includes dynamically changing the division of base station spectrum 20 among the repeaters 14 in each cell, to adapt the portions of base station frequency spectrum 20 used by the repeaters 14, to account for changing numbers of mobile terminals 16 being supported by individual ones of the repeaters 14.

For example, dynamically changing the division of the base station spectrum 20 among the repeaters 14 in each cell comprises dynamically adapting one or both of filter bank center frequencies and filter bank bandwidths in repeater filtering/combining circuits, in one or more of the repeaters 14, to adjust that portion of the base station frequency spectrum 20 at which each of the one or more repeaters 14 operates. In a non-limiting case, dividing the base station frequency spectrum 20 in one neighboring cell comprises associating progressively higher frequencies in the base station spectrum 20 with each succeeding repeater 14 in the chain 10 of repeaters 14 in that cell, and dividing the base station frequency spectrum 20 in another neighboring cell comprises associating progressively lower frequencies in the base station spectrum 20 with succeeding repeaters 14 in the chain 10 of repeaters 14 in that cell.

Further, note that in one or more embodiments each repeater 14 includes at least one of (a) one or more variable bandwidth band pass filters or (b) one or more low-pass filters and frequency translation circuits, which are configurable via one or more control messages received by the repeater, for aggregating uplink signals and de-aggregating downlink signals at the repeater. That is, the de-aggregation (and aggregation) operations that are desired for each repeater 14 in a given chain 10 of such repeaters, can be carried out via configurable filter circuits, whether they are implemented using variable bandwidth band pass filter circuits and/or using low pass filter circuits and associated frequency translation circuits. Further, in at least one such embodiment, the base station 12 (or one of the repeaters 14) acts as a master controller for the repeater chain 10, and sends control messages (e.g., RCCI communications) along the repeater chain 10, where the message(s) targeted to a specific repeater 14 include instructions for configuring its filtering circuits, for the desired frequencies of operation.

Figure 8:
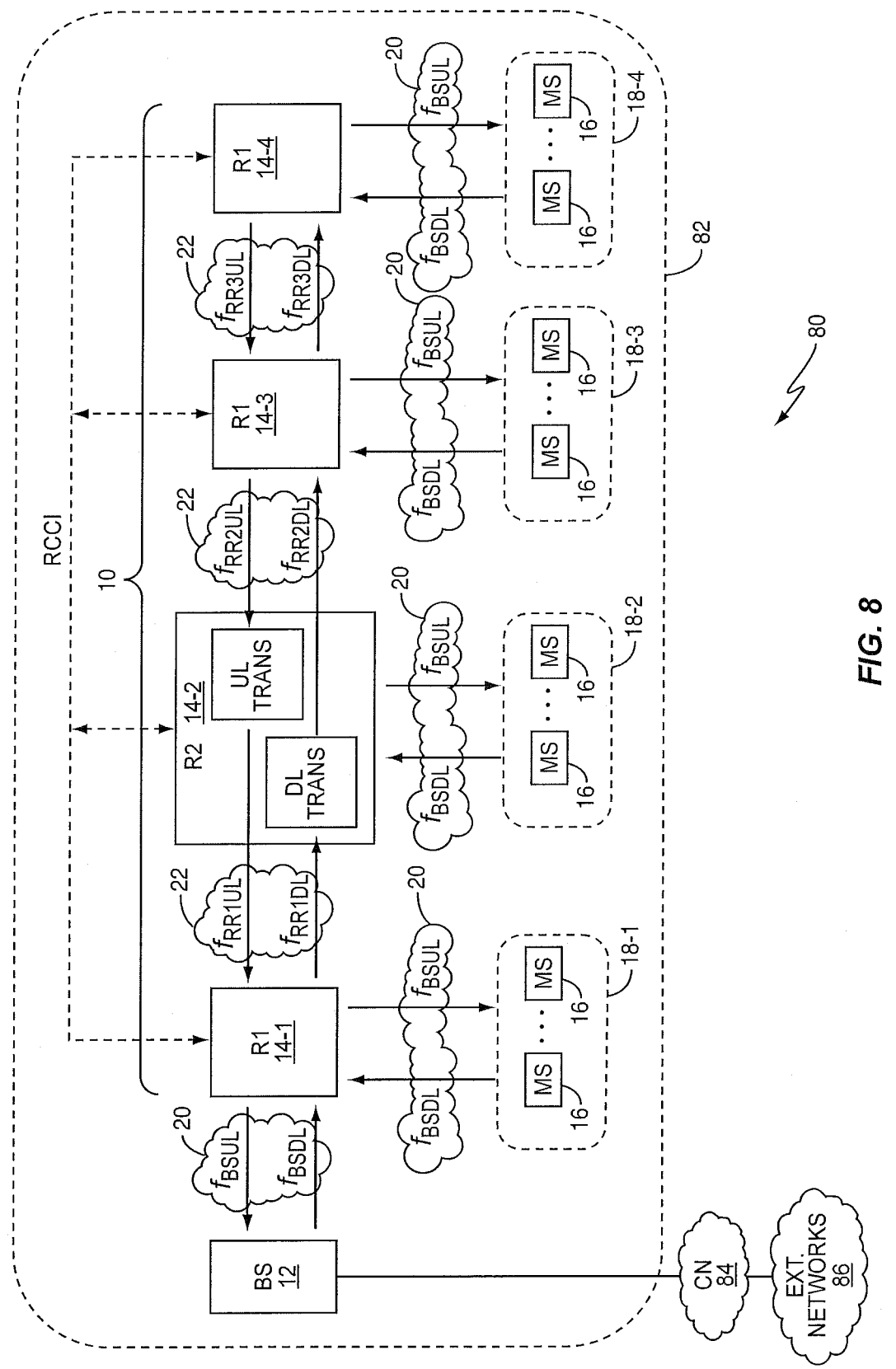
FIG. 8 is a block diagram of one embodiment of a repeater chain, shown in context with a wireless communication network.

In any case, the above frequency patterning is an example of "spectral interleaving" as described in more detail later herein. However, it should be understood that spectral interleaving can be used to significant advantage in multi-cell communication networks. FIG. 8 depicts such a wireless communication network 80, where one cell 82 is depicted for simplicity. It should be understood that a plurality of neighboring cells 82 could each include a repeater chain 10 that is associated with the cell's base station 12, and that the plurality of base stations/cells may be associated with a Core Network (CN) 84. In turn, the CN 84 provides communicative access to one or more external networks 86, such as the Internet.

One or more embodiments of the proposed repeaters 14 provide MIMO support, as well as supporting multiple band operation. For multiple band MIMO embodiments of the repeaters 14, the transmitter and receiver antennas of each repeater 14 can be shared by different radio bands with duplex filters and antenna switches, and the transmitter and receiver channels can be duplicated and optimized at different frequency bands. Within the cell area covered by the base station 12, the plurality of repeaters 14 in the chain 10 can be installed/positioned, for use in relaying downlink and uplink signals between the base station and one or more mobile terminals 16, e.g., high-rate data signals, such as used in LTE Advanced.

In FIG. 8, one sees that the base station frequency spectrum 20 includes one of more downlink frequency bands $f_{BSDL}$, and one or more uplink frequency bands $f_{BSUL}$. One further sees that each relay 14 repeats downlink signals to its directly supported mobile terminals 16 in the downlink frequency bands $f_{BSDL}$, and receives uplink signals from those directly supported mobile terminals 16, in the uplink frequency bands $f_{BSUL}$.

The above use of frequency spectrum can be used for multi-band transmission/reception, where the base station 12 and one or more of the mobile terminals 16 transmit/receive information in several bands simultaneously, at least for short periods, for high-rate transfers. For supporting such cases, the repeaters 14 may be equipped with paralleled radio transceivers (in 30 and/or 32) that operate in different frequency bands, for the frequency and band aggregations needed to reach maximum data rates.

Still further, one sees that each repeater 14 uses different bands within the repeater frequency spectrum 22, e.g., R1 relays downlink signals using one or more bands in the repeater frequency spectrum 22 denoted as bands $f_{RR1DL}$, and receives (relayed) uplink signals from R2 on one or more bands in the repeater frequency spectrum 22 denoted as bands $f_{RR2UL}$. All BS-to-terminal and terminal-to-BS channel signaling and control information is also transmitted in the down/up links.

Additionally, repeater command/control and information signaling messages may be carried to and from given ones of the repeaters over an "RCCI" (Repeater Channel Control Information) connection, spanning the repeater chain 10. (Referring to FIG. 4 momentarily, the RCCI signaling between repeaters 14 may use the repeater communication interface 64/repeater controller 62, and may be carried out in the repeater frequency spectrum 22.) In at least one embodiment contemplated herein, RCCI signaling between repeaters is a low-rate, low-overhead protocol that allows repeaters 14 to share command and control information, to coordinate their operations. Each repeater 14 thus may have bi-directional control links to uplink towards the base station 12 and downlink control links towards next successive repeater 14 in the downstream.

Figure 4:
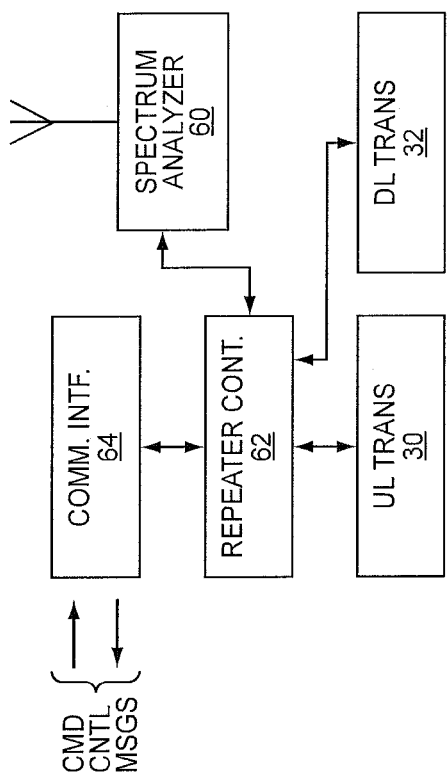
FIG. 4 is a block diagram of one embodiment of a repeater, for use in a multi-hop repeater chain, including a repeater controller and a spectrum analyzer, for finding repeater-to-repeater relay frequencies.

As for relaying uplink and downlink signals between repeaters 14, the repeater-to-repeater communications between any two repeaters 14 can be based on defining the repeater frequency spectrum 22 in any available (and allowable) radio spectrum existing in the local areas where the repeaters 14 are located. Repeater frequency spectrum 22 can be reused between repeaters in different cells, although band selection may be performed to minimize interference between repeaters 14. For example, as depicted in FIG. 4, each repeater 14 may include a spectrum analyzer 60, to find preferred (low-interference) bands for repeater-to-repeater communications.

In general, the repeater frequency spectrum 22 is outside of the base station frequency spectrum 20, and, in one or more embodiments, the repeater frequency spectrum 22 is chosen higher than the "normal" or standard mobile telecommunication frequency spectrum, for example in the range of 3-15 GHz. Choosing higher frequencies minimizes the size requirements for the transmit/receive antennas used by the repeaters 14, for inter-repeater communications. Also, in one or more embodiments contemplated herein, the communication connections between the repeaters 14 are based on wireline coupling.

Figure 9:
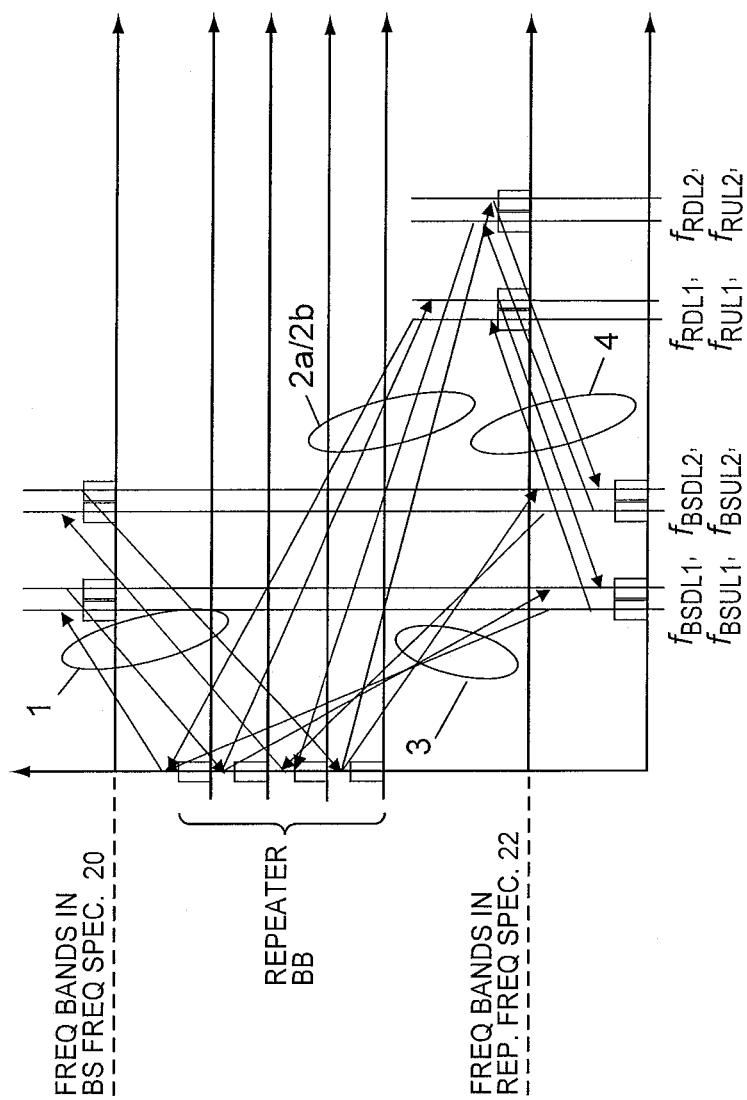
FIGS. 9 and 10 are diagrams of example frequency translations at a given repeater, or a given chain of repeaters.

In comparing conventional terminal-to-base station communications, which are based on a particular frequency channel, the repeaters 14 translate the received base station frequency spectrum 20 into the repeater frequency spectrum 22. For an example case of two frequency bands within the base station frequency spectrum 20, FIG. 9 illustrates an example translation. One sees that the base station 12 transmits/receives in two frequency bands ($f_{BSDL1}/f_{BSUL1}$, $f_{BSDL2}/f_{BSUL2}$) within the base station frequency spectrum 20. A first repeater 14 in the associated chain 10 of repeaters 14 downconverts the $f_{BSDL1}$ and $f_{BSDL2}$ signals into baseband (BB), for processing (filtering/separation).

Then, the repeater 14 repeats in the same base station frequency bands those downlink signals targeted to its directly supported mobile terminals 16 and relays the remaining downlink signals to the next repeater 14, by shifting them into the repeater frequency spectrum 22 (on corresponding bands $f_{RDL1}$ and $f_{RDL2}$). Similar frequency translation for relaying and retransmission on the uplink is shown for $f_{BSUL1}$, $f_{BSUL2}$, and $f_{RUL1}$, $f_{RUL2}$.

Figure 10:
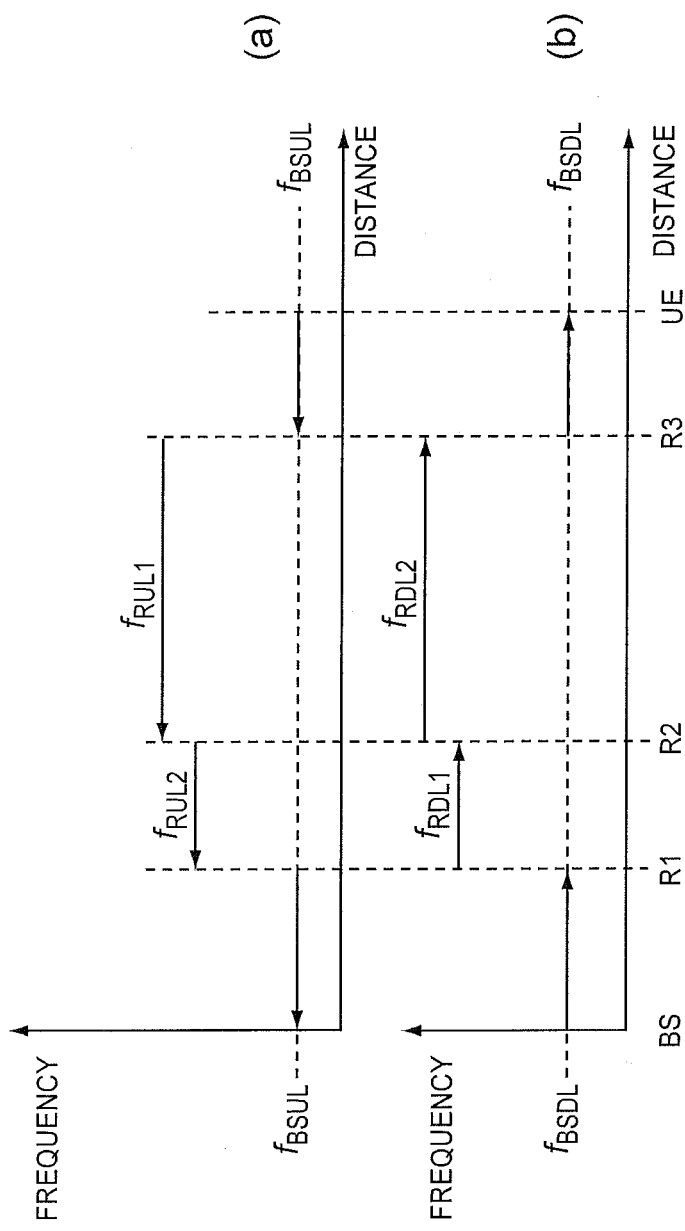

FIG. 10 illustrates an example one-band case, for frequency translation between a given mobile terminal 16 and the base station 12, through three repeaters 14 (R1, R2, and R3). One sees in plot (a) that transmissions from a mobile terminal 16 ("UE" for user equipment in the diagram) are transmitted (as normal) in the base station uplink $f_{BSUL}$. The R3 repeater 14 translates the uplink signals into a band denoted as $f_{RUL1}$ in the repeater frequency spectrum 22 and relays them to the next upstream repeater, the R2 repeater 14. In turn, the R2 repeater 14 relays the uplink signals to the R1 repeater 14, using a different band $f_{RUL2}$ within the repeater frequency spectrum 22. The R1 repeater 14 receives the relayed uplink signals in the $f_{RUL2}$ frequencies, translates them back to the correct base station frequency band $f_{BSUL}$, and repeats them to the base station 12. Similar processing is depicted in the (b) plot, for downlink transmissions to the mobile terminal 16, from the base station 12, through the three repeaters R1, R2, and R3.

Note, too, that the ($f_{RUL1}$, $f_{RUL2}$) and ($f_{RDL1}$, $f_{RDL2}$) frequencies can be reused within a given cell, or among a group of neighboring cells. For example, a combination of two frequency pairs can be used where the repeaters 1, 3, 5, . . . , use $f_{RDL1}$ and $f_{RUL1}$ for relaying and the repeaters 2, 4, 6, . . . , use $f_{RDL2}$ and $f_{RUL2}$. Alternating/spacing frequency reuse in this manner reduces interference within or among the cells. This two-frequency pair method can be applied to m-interleaved frequency groups, which can eliminate or greatly reduce the frequency interference among repeaters 14.

Figure 3:
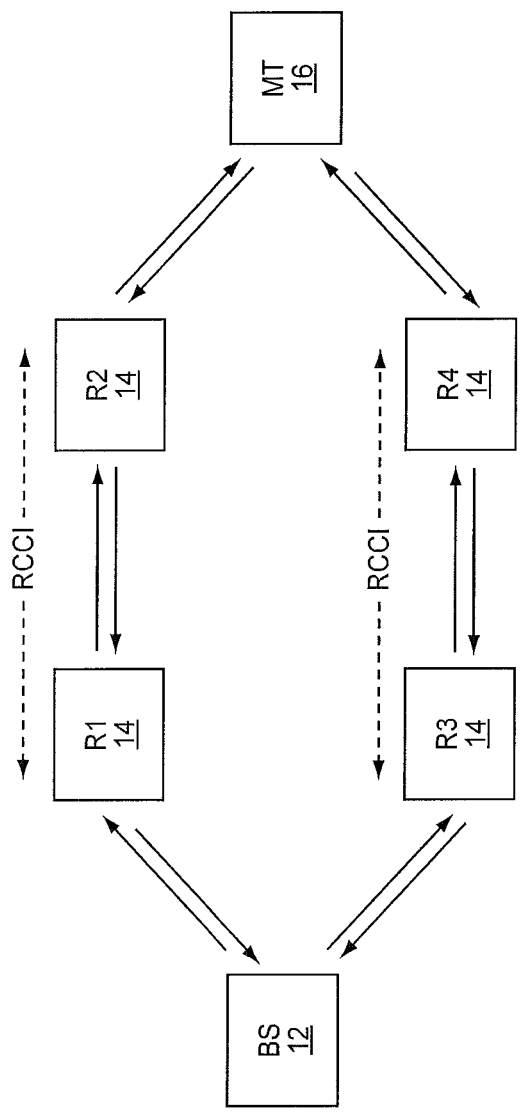
FIG. 3 is a block diagram of one embodiment of a repeater chain, including two repeater positions within the chain where paralleled repeaters are used for diversity transmission/reception.

The above frequency translation can also be used in multiband cases where paralleled uplink/downlink repeaters are used—such as shown in FIG. 3—where more relaying frequencies are needed. More broadly, the relaying frequencies within the repeater frequency spectrum 22, as used by a given repeater 14 on the uplink and/or downlink, can be indicated or controlled via messages over the RCCI interface of the repeaters 14. For example, in one or more embodiments, the RCCI includes these items: a repeater Identification Code (IC); Repeater Uplink Frequency (RCUF) assignments, Repeater Downlink Frequency (RCDF) assignments, Base-station Downlink Frequency (BDF) information, Base-station Uplink Frequency (BUF) information, Transmitter Power Levels (TPL), Receiver Signal Strengths (RSS), Beamforming Control Data (BFCD), Band Spectrum Estimation (BSE), Channel Code (CC), and Channel Quality Information (CQI).

The IC data identifies the physical address of each given repeater in a chain 10. It is therefore possible to direct messages to particularly identified repeaters 14, and to receive repeater identifications in RCCI messages. Being able to identify repeaters 14 from their message IDs provides for detecting or measuring the performance of a particular repeater 14 along a repeater chain 10, according to its IC, and for sending configuration messages targeted to that particular repeater 14.

The frequency translation information mentioned above includes RCUF, RCDF, BDF and BUF. Each RCUF and RCDF has a pair of frequencies for receiving and transmitting. Based on those frequency parameters, a repeater 14 can generate the needed communication signal frequencies using its frequency synthesizers, and thereby carry out the needed frequency translations.

Continuing with the RCCI items, TPL is the power level (or levels) that a repeater 14 uses for retransmission and for relaying—i.e., three power levels: Repeater uplink relaying power, Repeater downlink relaying power and local downlink retransmissions to mobile terminals 16 directly supported by the repeater 14.

Still further, the RSS information indicates the received radio signal strengths at the repeater's receivers. This information includes three signal strengths: Repeater downlink received signal strength, Repeater uplink received signal strength, and the received signal strength(s) of uplink signals, as transmitted by the repeater's directly-supported mobile terminals 16.

Still further, the Beamforming control data (BFCD) is used for setting the direction(s) of transceiver antenna arrays or parabolic antennas at the given repeater 14. For phased array antennas or motor driven parabolic antennas, for example, the data contains settings for repeater downlink and uplink antennas. For downlink transmission and uplink reception in the base station frequency spectrum 20 (with the repeater's local mobile terminals 16), beamforming may be replaced by MIMO antennas.

Still further, the Band spectrum estimation (BSE) item relates to spectrum analysis done for or by a repeater 14. The spectrum estimation is done, for example, by the spectrum analyzer 60 of a given repeater 14, as shown in FIG. 4. In one or more embodiments, the spectrum analyzer 60 includes a frequency-tunable Low Noise Amplifier (LNA), a mixer driven by a clock generator at a variable scanning frequency, a low-pass filter, and a power level detector. The LNA and the mixer form a homodyne receiver and by scanning the clock frequency, the noise level in a given frequency band is detected. The noise level and corresponding frequency are recorded. Such scanning may be carried out over multiple bands within the repeater frequency spectrum 22. After sweeping over multiple bands, the repeater controller 62 determines the "best" radio band as the one having the lowest measured noise level. (In one or more such embodiments, the evaluation of the "best" radio band also may take into consideration which bands complement a desired frequency reuse/interleaving pattern across multiple receivers, knowledge of which bands are in use elsewhere (e.g., for considerations of expected or probabilistic loading/interference issues), etc. In at least one embodiment, the BSE has two data fields, for uplink and downlink, respectively.

All of the above-mentioned RCCI data may be stored/carried in an RCCI data frame. Further, such information may be channel-coded, for protecting the data against channel errors. Corrected bit errors in received RCCI data frames may be stored at a given repeater 14 as channel quality information (CQI) for RCCI signaling. Such CQI information can be packaged into a next RCCI data frame to be transmitted by the given repeater 14, before its channel coding. As such, RCCI channel quality can be exchanged or otherwise advertised between repeaters 14 in the chain 10, and transmission power and/or coding robustness can be correspondingly adapted.

RCCI transmissions may be communicated between the base station 12 and its associated chain 10 of repeaters 14, and, of course, between repeaters 14. RCCI transmissions between the base station 12 and the first repeater 14 in the chain 10 may be conducted in the repeater frequency spectrum 22, e.g., using a fixed auxiliary channel defined in that spectrum. Alternatively, such information is communicated with frequencies in a radio band of the base station frequency spectrum 20, which can be assigned or otherwise controlled by the base station 12. Of course, as the data rate of the RCCI is very low, RCCI transmissions will not occupy more spectrum resource than the narrowest ordinary speech channel. Also, RCCI communication can be in the form of either Frequency Division Duplex (FDD) or Time Division Duplex (TDD), or some combination of both. Finally, it should be understood that RCCI messages sent from any and all repeaters 14 can be relayed up or down along the repeater chain 10, as needed, to reach a master (controlling) repeater 14 and/or to reach the base station 12, which may act as a master controller for the chain 10.

Figure 11:
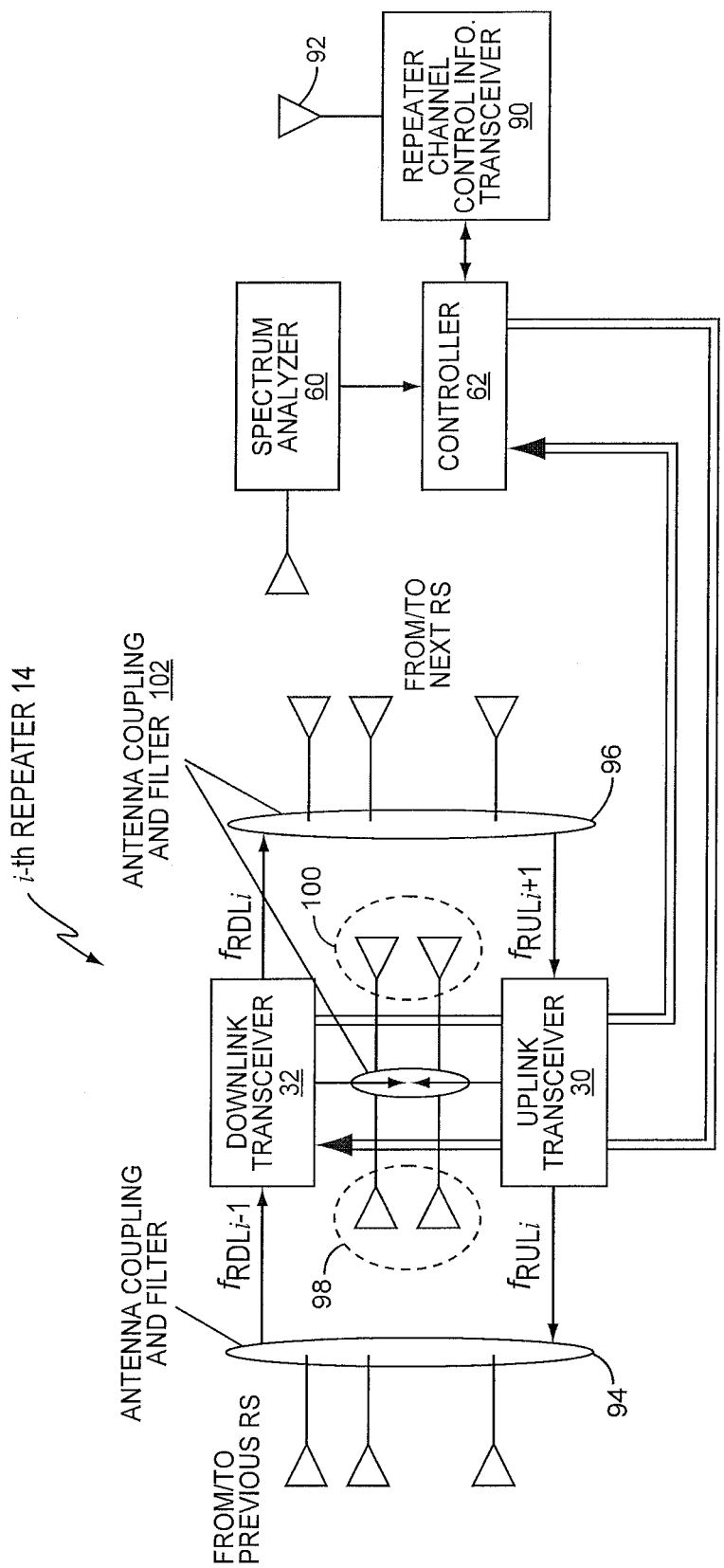
FIG. 11 is a block diagram of another embodiment of a repeater.

In view of such coordination and inter-repeater signaling, FIG. 11 provides an overview illustration of a given repeater 14, for one or more repeater embodiments contemplated herein. As in FIG. 4, the repeater 14 includes a spectrum analyzer 60, and a repeater controller 62 for controlling the spectrum analyzer 60 and other aspects of the repeater's overall operation. However, FIG. 11 further illustrates that the repeater 14 may include an RCCI transceiver 90 (with its own TX/RX antenna(s) 92), for receiving and transmitting RCCI to/from the base station 12 and other repeaters 14.

In further additional details, one sees that uplink and downlink transceivers 30 and 32 are associated with MIMO sets of receive/transmit antennas 94 and 96. Here, the diagram assumes that the depicted repeater 14 is an intermediate repeater 14 in the chain 10 (i.e., not the first or last repeater 14). Designating the illustrated repeater 14 as the i-th repeater 14 in the chain, it transmits to and receives from the preceding repeater 14 (i−1) in the repeater frequency spectrum 22 using antennas 94, and transmits to and receives from the next downstream repeater 14 (i+1) in the repeater frequency spectrum 22 using antennas 96. The transmissions to and receptions from the local mobile terminals 16 that are directly supported by the illustrated repeater 14 are in the base station frequency spectrum 20, and are supported via antenna sets 98 and 100 (and associated antenna filtering/coupling circuits 102). Note that the antenna sets include or are associated with antenna filtering/coupling circuits, to provide the appropriate isolation between antenna sets. Also note that all antennas and associated transceivers are implemented as MIMO antenna sets/transceivers, in MIMO-based embodiments of the repeater chain 10.

As a further note, there are two options for implementing the first one of the repeaters 14 in a given chain 10. One option is to place the first repeater 14 in the same "site" as the controlling base station 12 of the cell. That is, the first repeater 14 is co-located with the base station 12, or otherwise integrated with it. In such cases, the antenna 94 and the associated RF transceiver parts can be removed from the repeater 14, and all signals can be linked with direct connections or with (localized) RF connections using the base station frequency spectrum 20. Or, the first repeater 14 may be separated from the base station 12, and the communication between the two is established using RF signaling within the base station frequency spectrum 20.

With this configuration in mind, those skilled in the art will appreciate that a given repeater chain 10 can be set up using a fixed configuration, or at least using default-but-changeable settings for the repeater configurations. Additionally or alternatively, the associated base station 12 can configure all of the repeaters 14 in the cell, dynamically or statically. For example, the base station 12 can determine which repeaters 14 are to use which frequency bands in the repeater frequency spectrum 22 and can determine dynamic base station frequency assignments for various mobile terminals 16, to force all of the mobile terminals 16 that are local to a given repeater 14 to operate within a desired range of base station frequencies. In this sense, the base station 12 acts as the "master" providing overall frequency allocation/management control for the repeater chain 10.

Such configuration control can be managed by sending RCCI messages from the base station 12, targeted to individual repeaters 14 along the chain 10. As the example RCCI provides control information about IC, TPL, RSS, BFCD BSE and CQI, etc., the base station 12 can assign the power levels in each repeater 14 in the repeater chain 10, optimize the beamforming in the repeater transceivers 30/32 to improve SNR, schedule frequency hopping (if used) by the repeaters 14 to the best frequency band(s), and efficiently manage use of radio spectrum.

Figure 12:
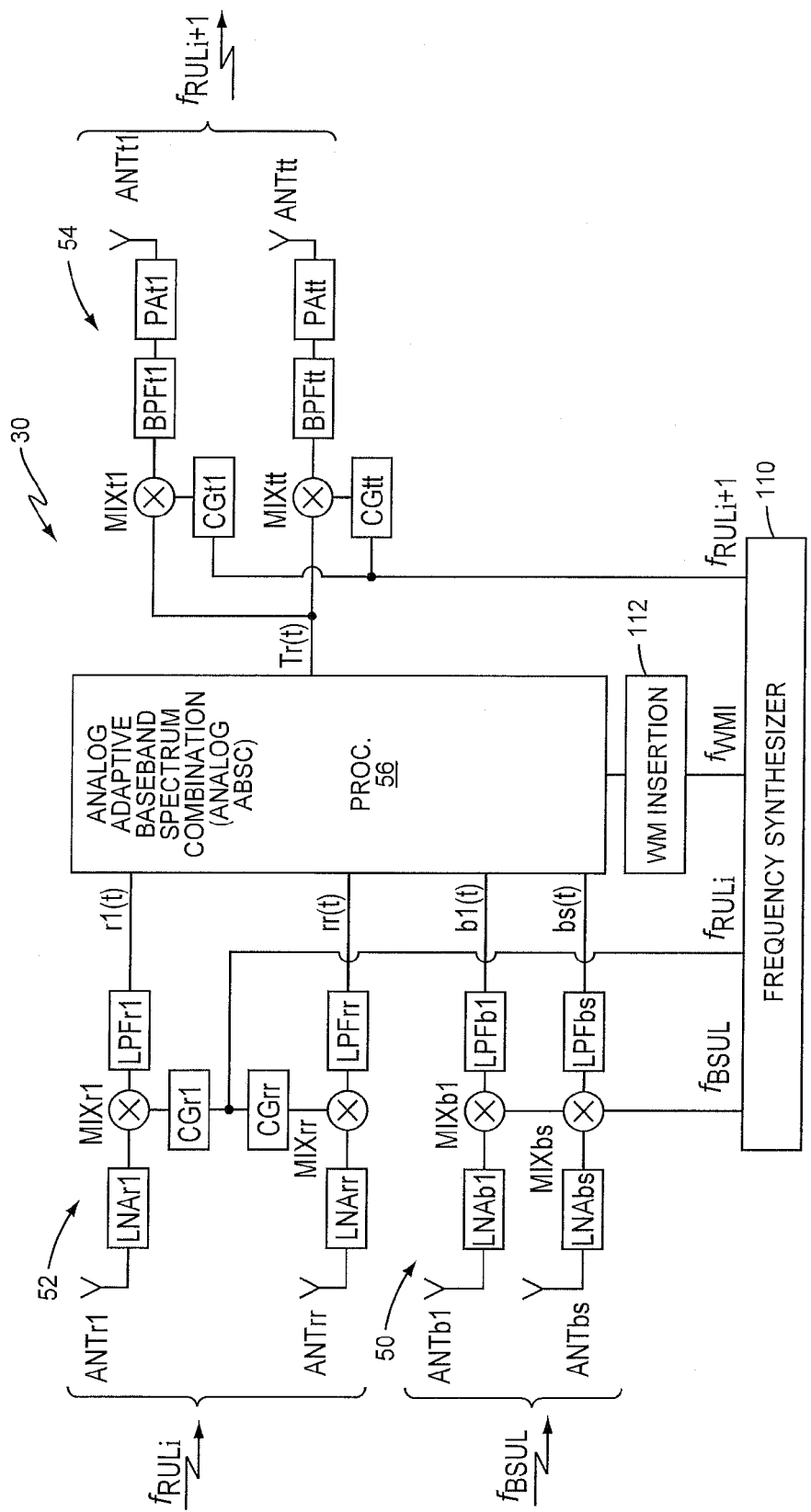
FIG. 12 is a block diagram of an analog embodiment of an uplink transceiver for use in a repeater.
Figure 13:
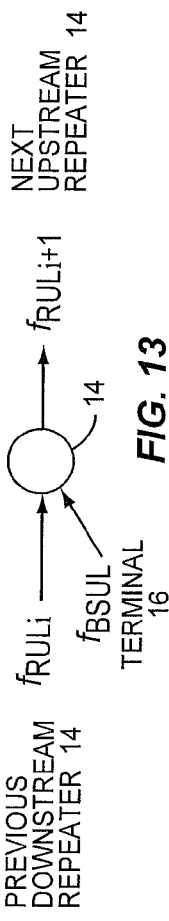
FIG. 13 is a diagram of example aggregation of uplink signals, at a given repeater in a repeater chain.

As for example radio spectrum processing, FIGS. 12 and 13 depict one embodiment of the uplink transceiver 30, as implemented at a given repeater 14 in a chain 10 of repeaters 14. In FIG. 12, one sees example implementation details for the first receiver 50, the second receiver 52, and the transmitter 54.

FIG. 13 explicitly illustrates the uplink signal aggregation, for the illustrated frequency bands, and FIG. 12 illustrates example circuit details for carrying out such aggregation. In the example, the (uplink) spectrum processor 56 is implemented, at least in part, as an analog adaptive baseband spectrum combining circuit. In association with these frequency-selective processing elements, the uplink transceiver 30 may include a multi-channel/multi-band frequency synthesizer 110, and, optionally, a watermark insertion circuit 112, for watermarking the transmissions from the transmitter 54.

Broadly, those skilled in the art will appreciate that the uplink transceiver 30 may have r receivers 52 operating at given relaying frequencies $f_{RULi}$ being used by the previous downstream repeater 14, and may include s receivers 50, for receiving uplink transmissions from the local mobile terminals 16, which are directly supported by the repeater 14. Further, the uplink transceiver 30 may include t transmitters 54 (with associated antennas) operating at relaying frequencies $f_{RULi+1}$, for transmission to the next upstream repeater 14. Note that r, s, t can be any integers larger than 0.

In an example embodiment, all the r receivers 52 are identical and are connected to r receiving antennas separately. Each such receiver consists of an LNA, a mixer driven by a clock generator operating at frequency $f_{RULi}$ and with a desired phase shift, and a low pass filter. A clock generator in the frequency synthesizer 110 generates all required quadrature clocks with desired phase shifts.

Figure 14:
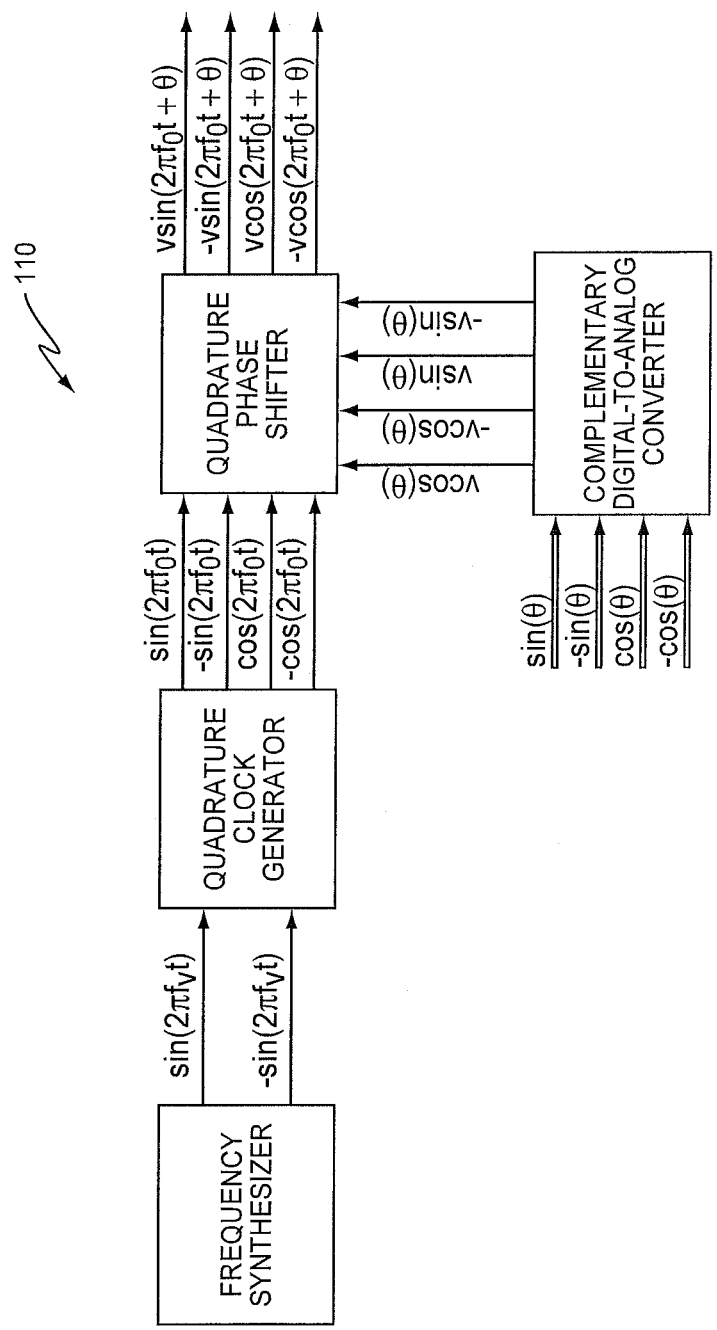
FIG. 14 is a block diagram of one embodiment of clock generation and frequency synthesizing circuitry, for use in the uplink/downlink transceivers of a repeater.

Operating as a general frequency synthesizer, the frequency synthesizer 110 may be configured to generate differential clocks from a voltage controlled oscillator (VCO). Referring to FIG. 14 as an example, one sees the generation of a frequency $f_v$ by a frequency synthesizer at twice the output frequency $f_0$. A quadrature clock generator converts the differential clocks of frequency $f_v$ into differential quadrature clocks at frequency $f_0$. Using well known mixer operations, as mathematically expressed in the following equations, the quadrature phase shifter creates differential quadrature clocks with desired phase shift θ.

The sinusoidal signals +/−sin(θ), +/−cos(θ) are created digitally by a controller within the frequency synthesizer 110. These digital signals are converted to analog signals by a digital-to-analog converter (DAC). This arrangement allows the receivers 50 and 52 to operate as homodyne receivers that down-convert their respectively received uplink signals (at $f_{BSUL}$ and $f_{RULi}$). That is, each receiver 50 and 52 down-converts their received RF signals in the whole band (at their respective center frequencies), into double-sided baseband signals, noted in FIG. 12 as $r_i(t)$ (with $i=1, 2, \ldots, r$).

Notably, the adaptive spectrum combiner circuit included in the spectrum processor 56 combines the two groups of double-sided baseband signals into outgoing uplink signals, for transmission by the transmitter 54. Here, the first group ($b_i(t)$) of down-converted uplink signals is received from local mobile terminals 16 via the receiver 50, and the second group ($r_i(t)$) is down-converted from the uplink signals received from the previous repeater 14. The two groups of uplink signals (first incoming and second incoming) are merged into one output $Tr(t)$ by the adaptive combining circuit in the spectrum processor 56.

As an example embodiment, a linear operation for such combining can be written as $$Tr(t) = \sum_{i=1}^{r} wr_i \cdot (r_i(t - Dr_i) + nr_i(t - Dr_i)) + \sum_{i=1}^{s} wb_i \cdot (b_i(t - Db_i) + nb_i(t - Db_i)) + WM, \quad \text{(Eq. 1)}$$

where $r_i(t)$ and $b_i(t)$ are the down-converted baseband signals, $nr_i(t)$ and $nb_i(t)$ are the receiver noise at baseband frequency, $wr_i$ and $wb_i$ are the weight coefficients, $Dr_i$ and $Db_i$ are the time delays, and WM is a water mark (a known and simple modulated signal), respectively. Assuming that receiver noise is a stationary and continuous-time random process, the above equation becomes $$Tr(t) = \sum_{i=1}^{r} wr_i \cdot (r_i(t - Dr_i) + nr_i(t)) + \sum_{i=1}^{s} wb_i \cdot (b_i(t - Db_i) + nb_i(t)) + WM. \quad \text{(Eq. 2)}$$

By adaptively tuning the time delays $Dr_i$ and $Db_i$, and the weight coefficients $wr_i$ and $wb_i$, the inter-symbol interference (ISI) due to the multi-path propagation can be reduced, and the SNR of the received baseband signals is improved because of both suppressed ISI and noise in the linear summing operation. Further, the basic aggregating function of combining the local uplink signals incoming from the directly-supported mobile terminals 16 and the incoming (re-layed) uplink signals is efficiently accomplished. (Here, these first and second incoming uplink signals are not overlapping before or after the combination. Rather, combining can be understood as translating them into the desired bands within the repeater frequency spectrum 22 and relaying them together to the next upstream repeater 14.) Different algorithms can be used to optimize different criteria such as zero-forcing (ZF), minimum mean square error (MMSE), least square (LS), maximum likelihood sequence (MLS), etc. The WM signal, which is optionally included, is used in the optimization process, as the signal is known and very easy to be demodulated.

The baseband signal output $T_r(t)$ is up-converted to relay frequency, $f_{RULi+1}$. The frequency band(s) to use for such relaying may be known at the repeater 14 based on, for example, receiving RCCI signaling. Each of the t parallel transmitters 54 operate simultaneously, with each including an up-conversion mixer (MIX) driven by a clock generator operating at frequency $f_{RULi+1}$ and with a desired phase shift, a band-pass filter (BPF), a power amplifier (PA), and one or more antennas. The t transmitters 54 operating with a desired phase shift create a phased array antenna with beamforming to the next repeater 14 in the repeater chain 10. Of course, phased array antennas can be replaced by a parabolic antenna, such as when the operating frequency is very high—e.g., in the microwave frequency range.

Figure 15:
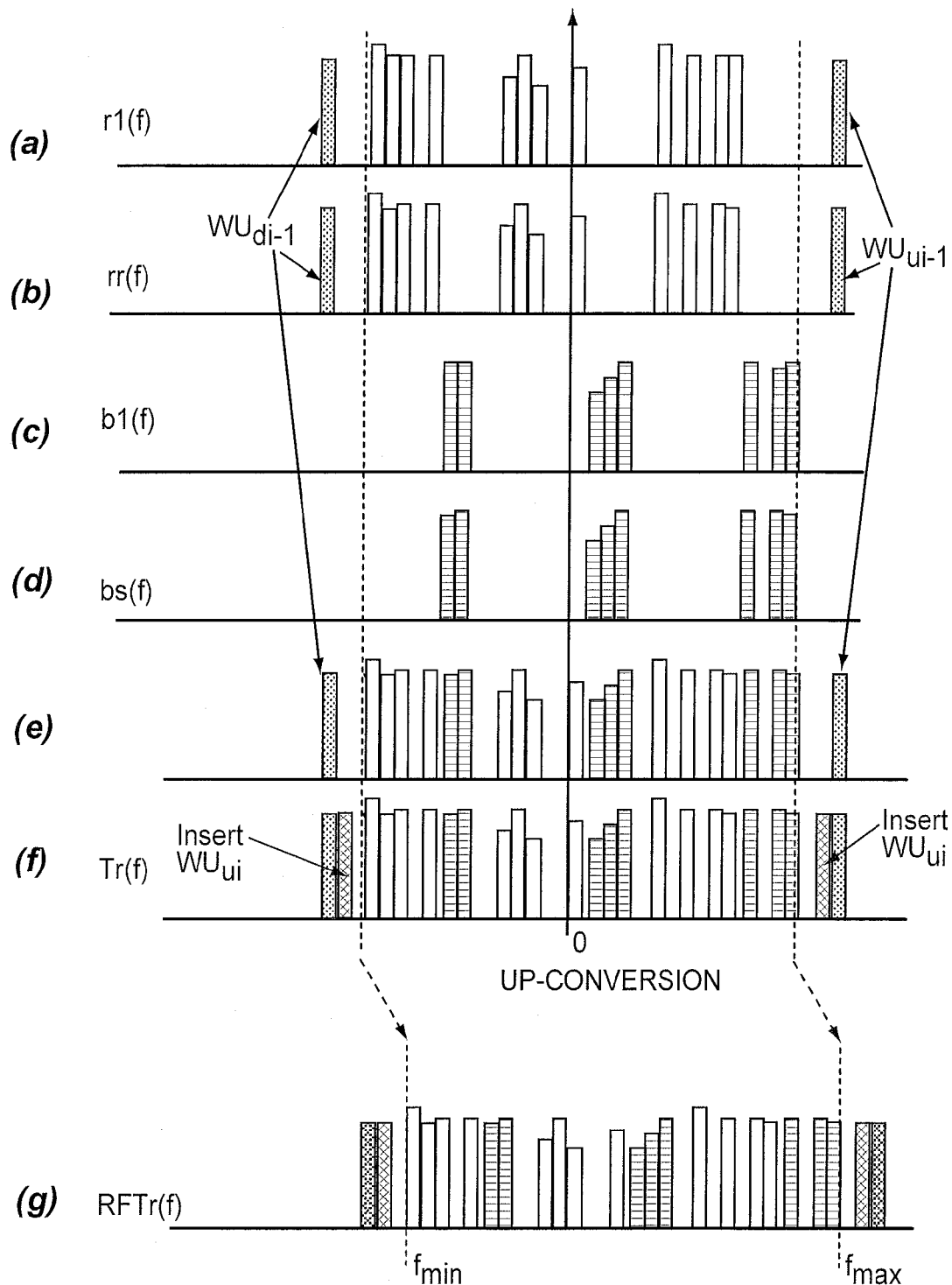
FIG. 15 is a diagram of example uplink spectrum aggregation for a repeater chain, and further illustrates example watermark signal insertion.

An example output spectrum at a repeater uplink transceiver 30 is shown in FIG. 15, including plots (a) through (g). Plots (a) and (b) illustrate the baseband signal spectrum at the output of the r receivers 52, and (c) and (d) are baseband signal spectrum created by local mobile terminals 16, based on the uplink signals received by the s receivers 50. The signal spectrum $WU_{ui-1}$ is the spectrum of a watermark signal inserted by the previous (downstream) repeater 14 along the chain 10, which is a known simple modulated signal inserted for tracking transceiver performance during optimization process. At the current repeater 14, a new WM signal $WU_{ui}$ is inserted as seen in plot (f), and this baseband signal is up-converted in the MIXs, filtered in the BPFs, amplified by the PAs, and finally transmitted over the air to the next upstream repeater 14. See plot (g) for the example radio spectrum of that relay transmission.

Note that the WM signal can be a sinusoid with different frequency, or any orthogonal sequences that can easily be demodulated, like Walsh or Hadamard sequences, etc. As the relayed uplink signals finally arrive (in aggregated form) at the base station 12, they can be analyzed, so that the performance of each repeater 14 along the repeater chain 10 can be individually checked. The base station 14 may be configured to optimize or at least adjust one or more repeater parameters, based on evaluating the uplink signals received from the repeater chain 10.

Figure 16:
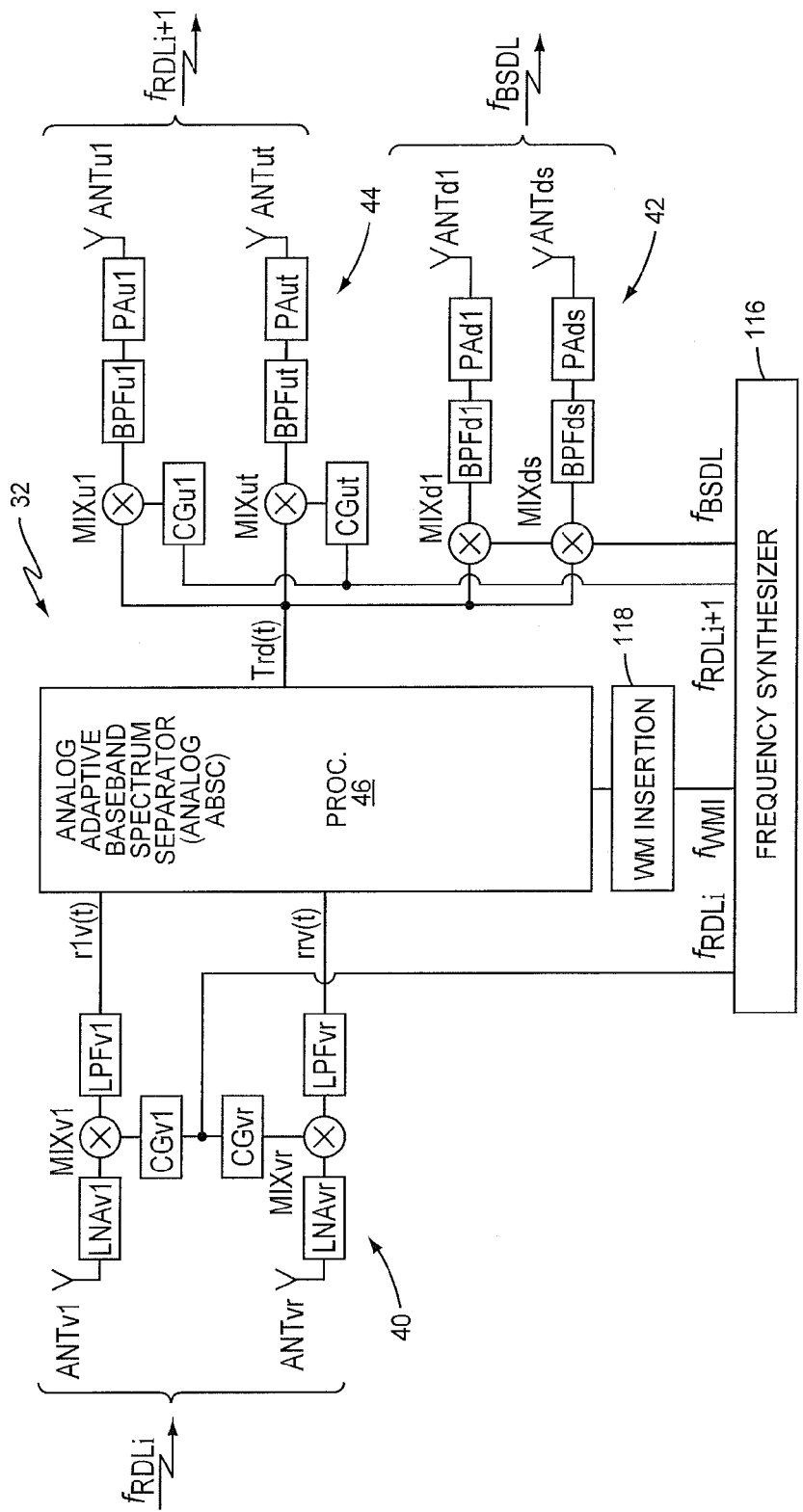
FIG. 16 is a block diagram of an analog embodiment of a downlink transceiver for use in a repeater.

As FIG. 12 depicted an analog implementation of the uplink transceiver 30, for use in a given repeater 14, FIG. 16 depicts an example analog implementation for the downlink transceiver 32. The downlink transceiver 32 has r receivers 40 operating at a relay frequency $f_{RDLi}$. (The value of r is 1 or greater, and greater numbers may be configured to operate in parallel, for multi-band processing.)

Figure 17:
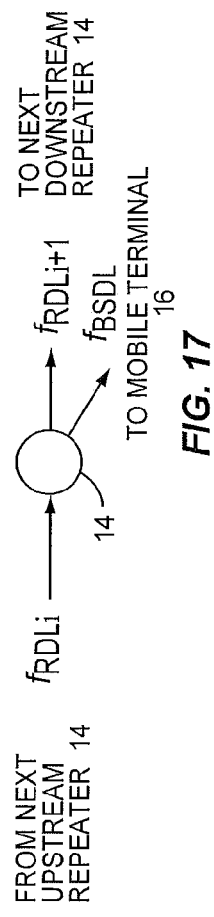
FIG. 17 is a diagram of example de-aggregation of downlink signals, at a given repeater in a repeater chain.

FIG. 17 illustrates an example of the frequency-based de-aggregation performed by the repeater 14 of FIG. 16. In carrying out that de-aggregation, FIG. 17 illustrates that the downlink transceiver 32 further includes an analog Adaptive Baseband Spectrum Separation (Analog ABSS) circuit, for separating the incoming baseband signals (as received via the receiver(s) 40), into first outgoing baseband signals and second outgoing baseband signals. This circuit is implemented, for example, in the signal processing circuits comprising the spectrum processor 46 in the downlink transceiver 32.

The first outgoing baseband signals are those targeted to the mobile terminals 16 that are directly (locally) supported by the repeater 14. The second outgoing baseband signals are those targeted to mobile terminals 16 that are not directly supported by the repeater 14—i.e., to those mobile terminals 16 supported by the downstream repeater(s) 14. Correspondingly, the downlink transceiver 32 also has s radio frequency transmitters 42, that transmit the downlink signals targeted to the local mobile terminals 16, using the base station frequency spectrum 20. The downlink transceiver 32 further includes t transmitters 44 (and associated antennas) operating at the $f_{RDLi+1}$ frequency band(s). (The values of s and t are each 1 or greater; having more than one transmitter 42 (or 44) operating simultaneously and in parallel provides for multi-band transmission, for example. The numbers of paralleled receivers and transmitters may be different in the downlink transceiver 32, as compared to the uplink transceiver 30.)

Still further, the downlink transceiver 32 includes a frequency synthesizer 116, which creates desired communication signal frequencies. And, additionally, the downlink transceiver 32 optionally includes a watermark insertion unit 118, for inserting watermarks into the transmitted downlink signals (or at least those relayed to the next repeater 14 in the chain 10).

Those skilled in the art will appreciate that at least some of the signal processing circuits, and associated supporting frequency/timing generation circuitry, can be shared between the uplink and downlink transceivers 30 and 32, within a given repeater 14. For example, the spectrum processors 46 and 56 may include or otherwise share at least some of the same circuitry. In any case, the main difference between the uplink and downlink transceivers 30 and 32, respectively, is that, in the uplink direction, the repeater 14 needs to combine the local uplink signals with the relayed uplink signals, while, in the downlink, it needs to split the incoming downlink signals into two different frequency bands, one in the repeater frequency spectrum 22 and one in the base station frequency spectrum 20.

Thus, each repeater 14 relays to the next upstream repeater 14 the combination of the uplink signals it received from its local mobile terminals 16 and the uplink signals it received from the next downstream repeater 14. Conversely, instead of the upstream aggregation of uplink signals, propagation of downlink signals along the repeater chain 10 relies on de-aggregation, where each repeater 14 receives incoming downlink signals and separates them into first outgoing downlink signals and second outgoing downlink signals. The first outgoing downlink signals are locally repeated to the mobile terminals 16 directly supported by the repeater 14, and the second outgoing downlink signals are relayed to the next downstream repeater 14. As such, remote repeaters 14 further away in the chain 10 from the base station 12 may have many empty channels and less interference to others. To achieve this, a base station 12 in a cell is able to register a mobile terminal 16 inside the cell, and sense its location roughly by finding the uplink RF signal incoming directions and relative delays, then assign one or more repeaters 14 to communicate with the mobile terminal 16. As such, the mobile terminal 16 can be located, even with physical layer repeaters (and without need for opening the packets being transmitted).

Figure 18:
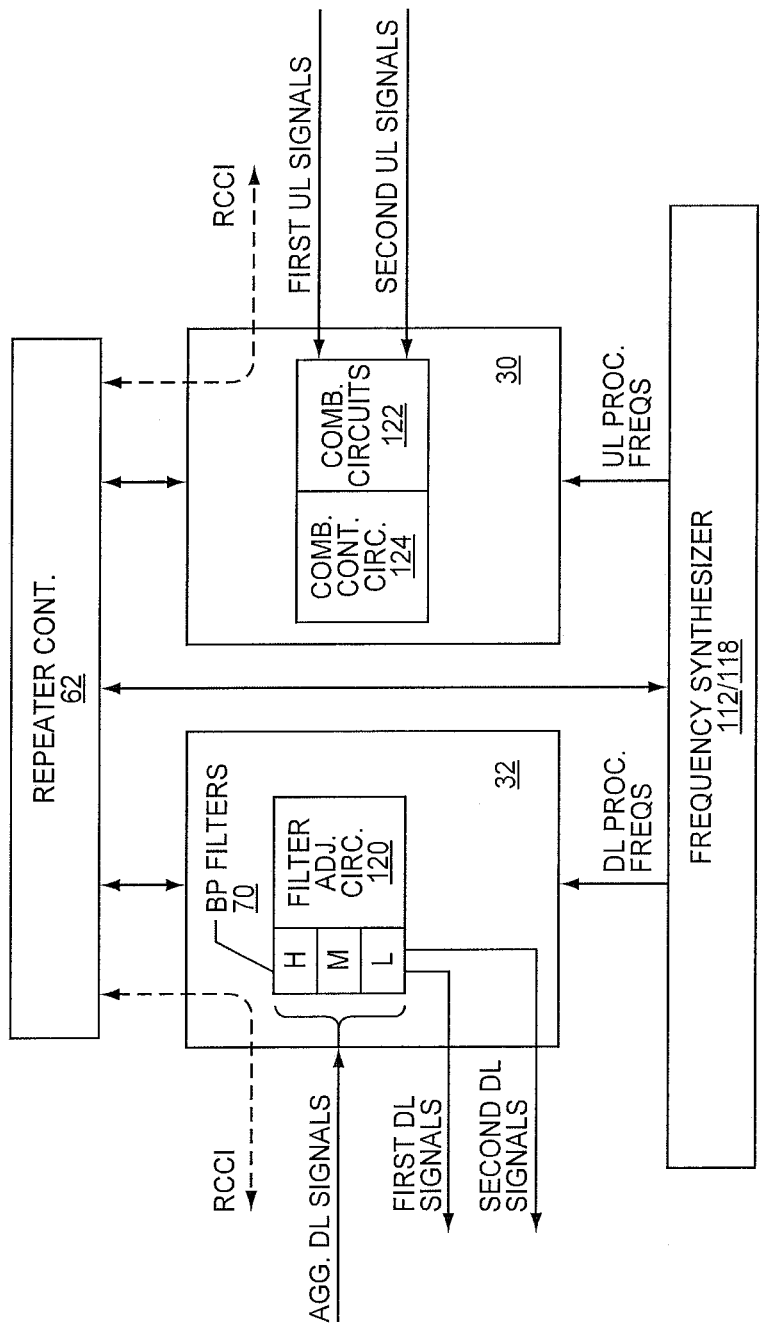
FIG. 18 is a block diagram of one embodiment of a digital implementation of uplink and downlink transceivers in a repeater.

While such advantages may be gained with analog or digital implementation of the required spectrum processing at the repeaters 14, there may be advantages in implementing such processing in the digital domain. FIG. 18 depicts a digital embodiment of uplink and downlink transceivers 30 and 32. One sees that the repeater controller 62 receives (and passes through) RCCI messages that may carry frequency assignments and other control information, to be used for configuring the depicted repeater 14 (and other repeaters 14 in the chain 10).

One also sees that the illustrated embodiment of the downlink transceiver 32 includes a bank of adjustable filters 70 (such as first shown in FIG. 6), and an associated filter adjustment circuit 120. The filter adjustment circuit 120 may be responsive to RCCI messages addressed to the repeater's ID, and may be dynamically updated for the desired communication frequencies. Notably, the filter adjustment circuit 120 and the bank of adjustable filters 70 may be implemented as part of the (downlink) spectrum processor 46.

Similarly, the illustrated embodiment of the uplink transceiver 30 includes adjustable combining circuits 122 (for non-overlapping combining of uplink signals positioned at/in different baseband frequency bands), and an associated combining control circuit 124. These circuits are, in one or more embodiments, implemented as part of the (uplink) spectrum processor 56. Further one sees that the frequency synthesizers 112/118 provide the required frequency/clock signals to the transceivers 30 and 32, for their operation. The repeater controller 62 may dynamically configure frequency generation by the frequency synthesizers 112/118, as needed.

The advantages of digital implementation of the spectrum processors 46 and 56 include the potential for better SNR performance. As a further non-limiting advantage, any needed signal delays associated with transceiver combining/filtering operations can be directly implemented in the digital domain. Still further, multi-path interference cancellation performance can be improved, in general, over the analog processing domain, through implementation of the appropriate DSP algorithms.

Figure 19:
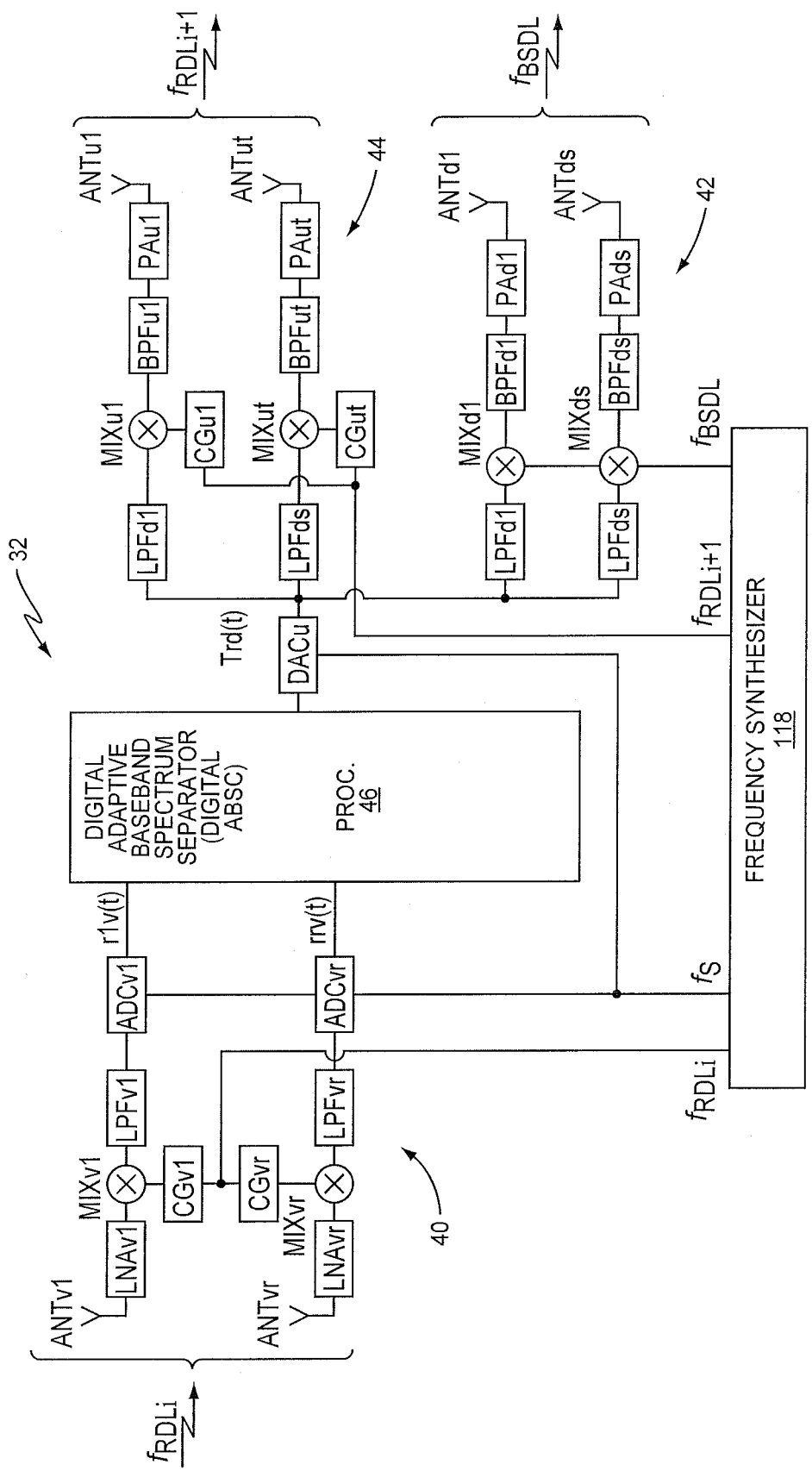
FIG. 19 is a block diagram of additional example details, for a digital embodiment of a downlink transceiver for use in a repeater.

Turning to FIG. 19, one sees digitally-based example implementation of the downlink transceiver 32. The depicted circuits include a digital implementation of the spectrum processor 46 of the downlink transceiver 32, in combination with the previously illustrated receiver 40, and transmitters 42 and 44. One may compare this digital-domain implementation to the similar, analog depiction given in FIG. 16.

Figure 20:
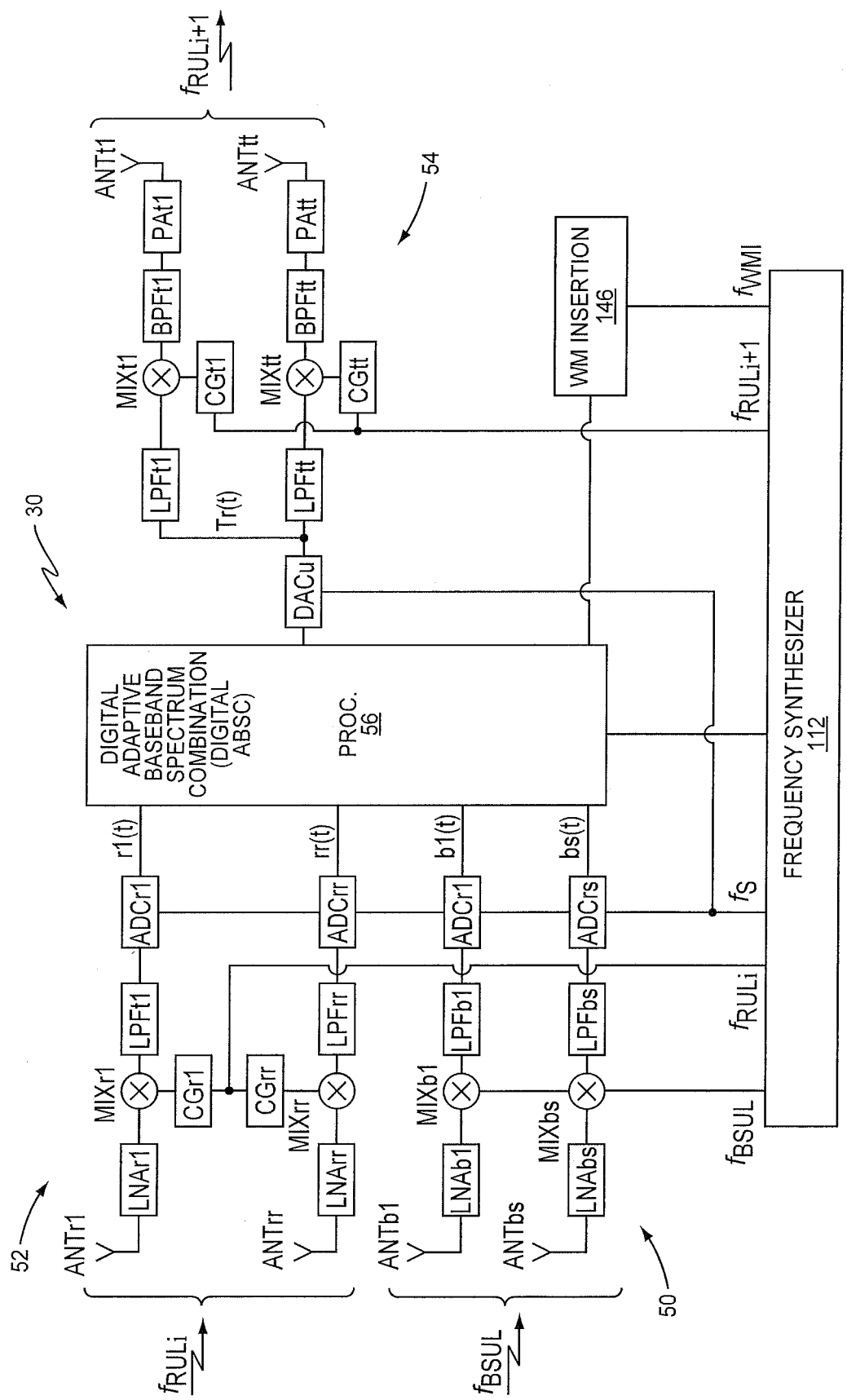
FIG. 20 is a block diagram of additional example details, for a digital embodiment of an uplink transceiver for use in a repeater.

Similarly, in FIG. 20 one sees an example digital implementation of the uplink transceiver 30. The depicted circuits include a digital implementation of the spectrum processor 56 of the uplink transceiver 30, in combination with the previously illustrated receivers 50 and 52, and transmitter 54. One may compare this digital-domain implementation to the similar analog depiction given in FIG. 12.

Figure 21:
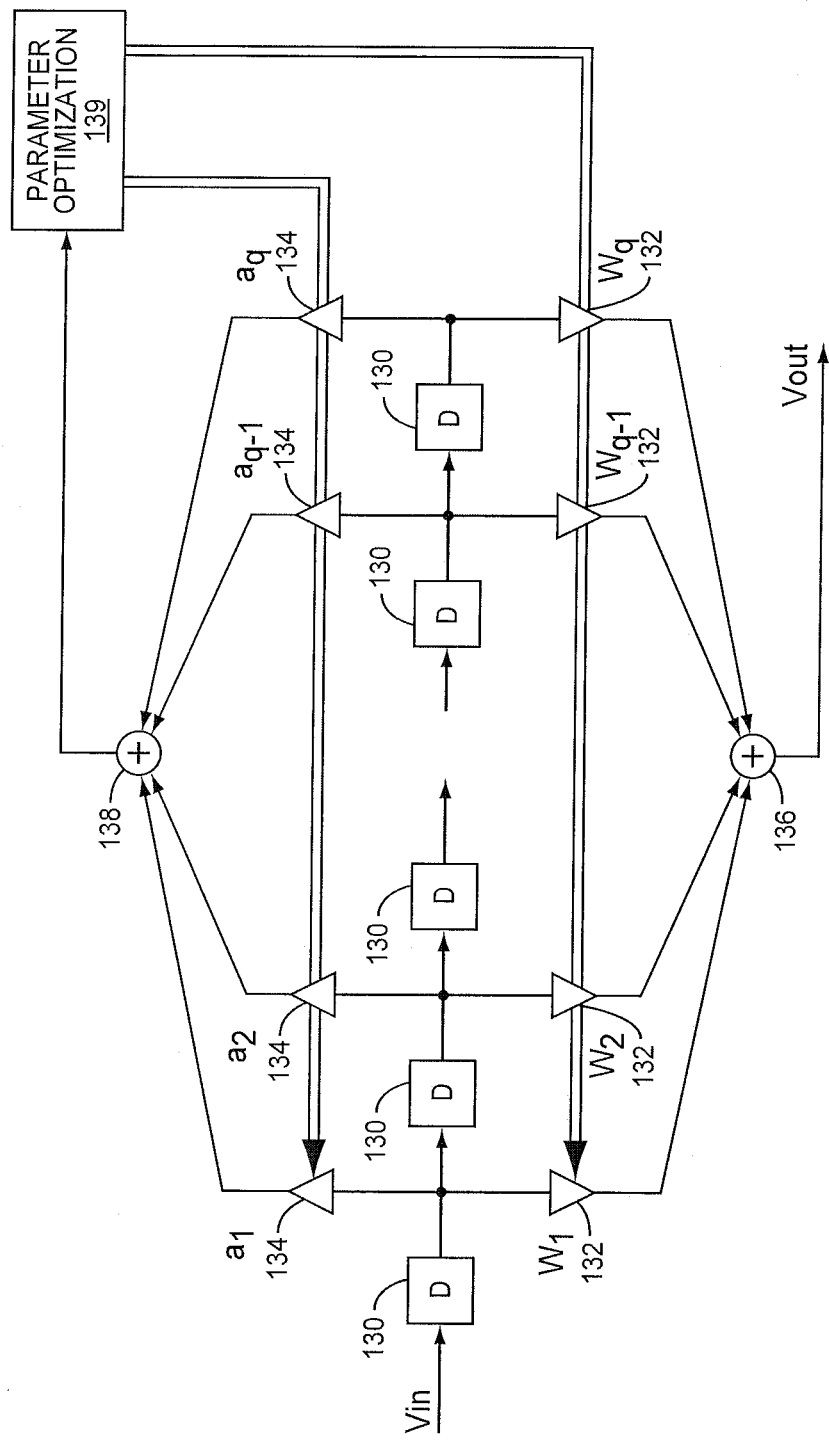
FIG. 21 is a block diagram of one embodiment of a digital signal processing circuit for multi-path echo cancellation in a repeater.

FIG. 21 depicts an example DSP-based embodiment of processing circuit configuration, for multipath echo cancellation. In particular, one or more hardware- and/or software-configured DSPs within the spectrum processors 46/56 may be used to implement the multi-path echo cancellation structure illustrated. That structure includes delay elements 130, first weighting elements 132, second weighting elements 134, summing circuits 136 and 138, and a parameter optimization block (calculator) 139.

The (multipath) input signal Vin is delayed and summed with working weight coefficients $W_i$, i=1, 2, . . . , q, and the output signal Vout is created by the summing. The parameter optimization block 139 is connected with another set of test weight coefficients $a_i$ (i=1, 2, . . . , q). Using a set of criteria (specified functions), the parameter optimization block 139 finds the optimal parameters by performing a cost evaluation. When new parameters are confirmed to reach a better result than the (current) working weight coefficients, the current working weight coefficients are replaced with the newly determined weight coefficients.

Figure 22:
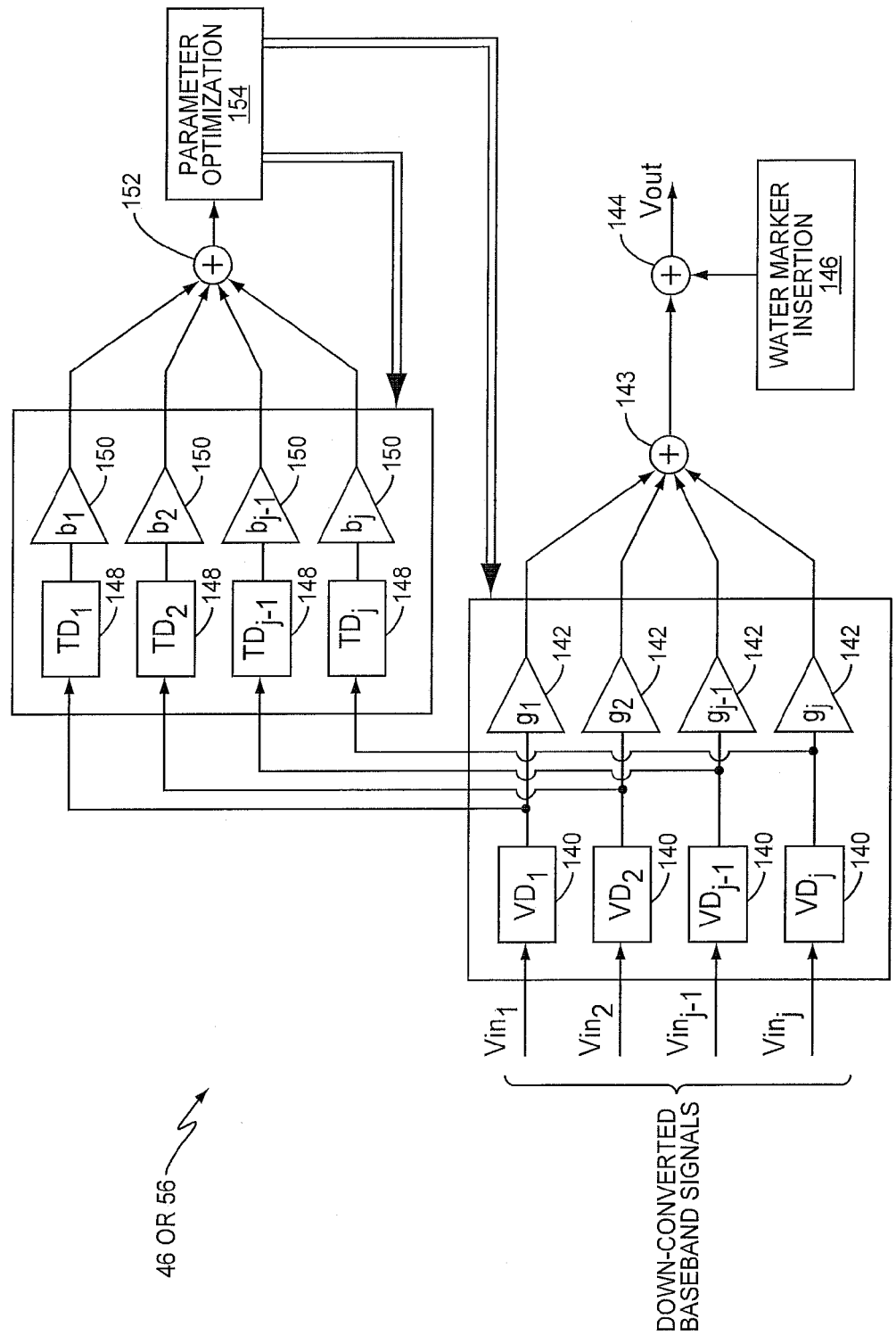
FIG. 22 is a block diagram of another embodiment of a digital signal processing circuit for multi-path echo cancellation in a repeater.

FIG. 22 extends this idea to the multiple-input case. As an example, the implementation of a digital version of the spectrum processor 56 in the uplink transceiver 30 may include the illustrated structure. That structure includes, by way of example, first (variable) delay elements 140, first weighting elements 142, a first summing circuit 143, a second summing circuit 144, a watermark insertion element 146, second (test) delay elements 148, second weighting elements 150, a third summing circuit 152, and a parameter optimization block 154.

The input signal vector Vin has j elements, $Vin_1, Vin_2, \ldots, Vin_{j-1}, Vin_j$, which are signals down-converted in baseband, including the local mobile terminal signals. They are delayed by a variable delay unit $VD_i$ (i=1, 2, . . . , j), and summed with working weight coefficients $g_i$ (i=1, 2, . . . , j) and the output signal Vout is created by summing. Further, the parameter optimization block 154 is connected with another set of test weight coefficients $b_i$ (i=1, 2, . . . , j) with small test delay $TD_i$ (i=1, 2, . . . , j). As before, the parameter optimization block evaluates a cost function according to criteria, to find the optimal parameters. When the new parameters are confirmed to reach a better result, then the working weight coefficients will be adjusted to the test weight coefficients, and the delay differences among the test delay units $TD_i$ will be added to the variable $VD_i$, and then all delays of $TD_i$ are reset to its minimum. Here, the difference in delay is defined as $TD_i$–mean ($TD_i$, where i=1, 2, . . . , j).

To calculate a cost using a criterion function, the WM signal from the watermark insertion unit 146 can be used, as that signal is known and easy to demodulate, and the demodulation of WM signal can be done in the physical layer. The WM is helpful in the parameter optimization process, as there is no need to decode any information packets carried by the base-station/mobile-terminal communication signals being handled by the repeater 14.

The order of the WM signals inserted along a given repeater chain 10 can be configured by the associated (controlling) base station 12 through RCCI signaling. The signal quality of the demodulated WM signals can be saved in the CQI fields of the RCCI signals. Thus, through RCCI signaling, the base station 12 obtains the required channel quality information of all repeaters 14 inside its cell.

For the uplink, all WM signals are accumulated along the chain 10 towards the base station 12, and the WM signals are orthogonal in the time domain (by orthogonal time sequences) and/or in the frequency domain. Thus, the base station 12 can analyze the WM signals from all repeaters 14 in the chain 10, and thereby obtain direct signal quality information for the uplink relaying.

For the case when a repeater 14 in a repeater chain 10 does not know the WM signals sent by its neighbors, the repeater 14 will detect if there are any WM signals. If so, it will use the detected WM signal(s) to optimize its associated communication channel(s), and, if not, it will not start the optimization process. In most cases, a given repeater 14 in a repeater chain 10 knows the WM signals sent by its neighbor repeaters 14 (i.e., its immediate upstream and downstream repeaters 14) and only the WM signals sent by its neighbors will be used in the repeater's optimization process.

Of course, in addition to aggregating WM signals in the uplink direction, the repeater chain 10 aggregates the users' uplink signals, as transmitted from the mobile terminals 16 supported by the repeater chain 10, and relayed up the repeater chain 10, to the base station 12. And, conversely, the downlink signals from the base station 12 are de-aggregated. That is, at any given time, the base station 12 transmits downlink signals targeted to any given number of mobile terminals 16. The repeater chain 10 propagates those downlink signals as far down the chain 10, as needed, but preferably no further than needed, to reach the targeted mobile terminals 16. Further, as was illustrated in the examples of FIGS. 4 and 5, such de-aggregation in the contemplated repeater chain 10 provides, particularly because of the chain's multi-hop configuration, opportunities for greater spectrum utilization and/or reduced levels of interference.

In terms of spectrum density, it will be appreciated that one or more embodiments of the base station 12 schedule users (mobile terminals 16) according to one or more service goals, such as the twin goals of maximizing overall system throughput, while ensuring some minimum "fairness" to all users, or at least ensuring that minimum Quality-of-Service (QoS) constraints are met. As such, the base station 12 uses as much of the uplink and downlink capacity as it can, and, again, as a general proposition, fully schedules uplink and/or downlink resources in each corresponding transmission interval.

As such, usage of the base station frequency spectrum 20 is higher (denser) in areas close to the base station 12 than it is at, say, the last repeater 14 in a chain of repeaters 14. That is, the base station 12 necessarily transmits on the downlink all downlink signals needed for each given transmission interval, while each repeater 14 repeats in the base station frequency spectrum 20 only those downlink signals needed to serve its directly supported mobile terminals 16. Therefore, the base station 12 can select the spectrum utilizations in a preferred pattern, and it may do so to minimize interference.

More particularly, neighboring base stations 12 in neighboring cells can adopt a particular pattern (or patterns) of base station frequency spectrum utilization. One such method contemplated herein is referred to as "Spatial Interleaved Spectrum" (SIS) method. With SIS, a different interleaving of the base station frequency spectrum 20 is used along the repeater chains 10 in each cell, so that inter-cell interference is minimized. In at least one such embodiment, the base stations 12 associated with these repeater chains 10 can be configured to set up the desired interleaving.

In such embodiments, each base station 12 has the ability to perform SIS (and SIS may be coordinated across multiple neighboring base stations/cells). Further, all repeaters 14 within a given multi-hop repeater chain 10 can register mobile terminals 16 existing in their own coverage area through a page function or they can get information about their associated mobile terminals 16 from the base station 12. Still further, the communication signal frequencies separated and/or combined in each repeater 14 are variable, e.g., each repeater's filter banks 70 are configurable in terms of their filtering frequencies. With these capabilities, the base station frequency spectrum 20 can be spatially interleaved in a manner that it reduces the interference between the cells.

Figure 23:
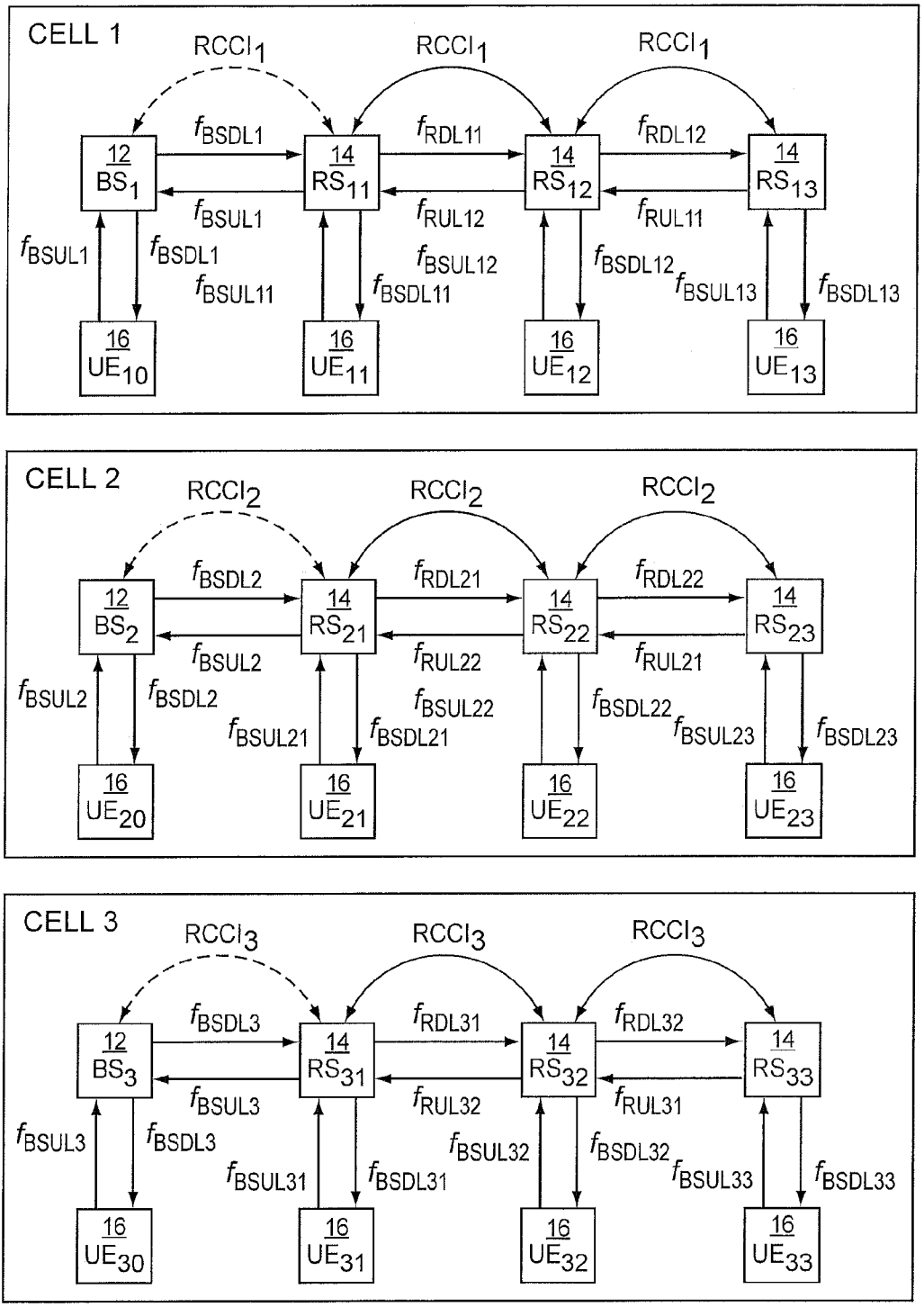
FIG. 23 is a diagram of three example cells, each including a base station and an associated repeater chain, where the base stations and repeaters are configured to implement a Spatial Interleaved Spectrum (SIS), wherein the pattern of usage for the base station frequency spectrum is differentiated between the repeater chains in neighboring cells, for interference reduction.

FIG. 23 illustrates three cells (CELL1, CELL2, and CELL3), which should be understood to be three neighboring cells in a wireless communication network, such as an LTE Advanced network. Each cell includes a base station 12 and an associated plurality of repeaters 14, configured as a multi-hop repeater chain 10. (Three repeaters 14 per chain 10 are shown, but each chain 10 can include essentially any number of repeaters 14.)

In CELL1, the repeater chain 10 is configured to use a Low Pass Spectrum (LPS), in which the mobile terminals 16 (denoted as UEs) belonging to the repeaters 14 closest to the base station 12 (labeled as BS1) will be assigned to use the higher frequency channels in the downlink band. The UEs belonging to the repeaters 14 further away from BS1 will be assigned to use the lower frequency channels, if it is possible to make such assignments. There is always a possibility that all UEs might be located close to the cell edge, but the idea is to start filling the lower channels with the UEs that are further away from BS1. The intelligence for allocating/assigning frequency resources in the base station frequency spectrum 20, to provide for the LPS scheme may be included in the processing/control circuitry of BS1.

Conversely, CELL3 is configured to use a High Pass Spectrum (HPS), in which the UEs belonging to the repeaters 14 closest to BS3 will be assigned to use the lowest possible frequency channels in the downlink band (of the base station spectrum 20), and the UEs belonging to the repeaters 14 further away from BS3 will be assigned to use the highest possible frequency channels. Further, as a compromise between CELL1 and CELL3, CELL2 is configured to use a Middle Pass Spectrum (MPS), in which the UEs belonging to the repeaters 14 further away from BS2 will be assigned to use the available frequency channels located in the center of the downlink band (in the base station frequency spectrum 20), and the UEs belonging to the repeaters 14 closer to BS2 will be assigned to use the lower and higher frequency channels, but not the middle portion of the band.

Figure 24:
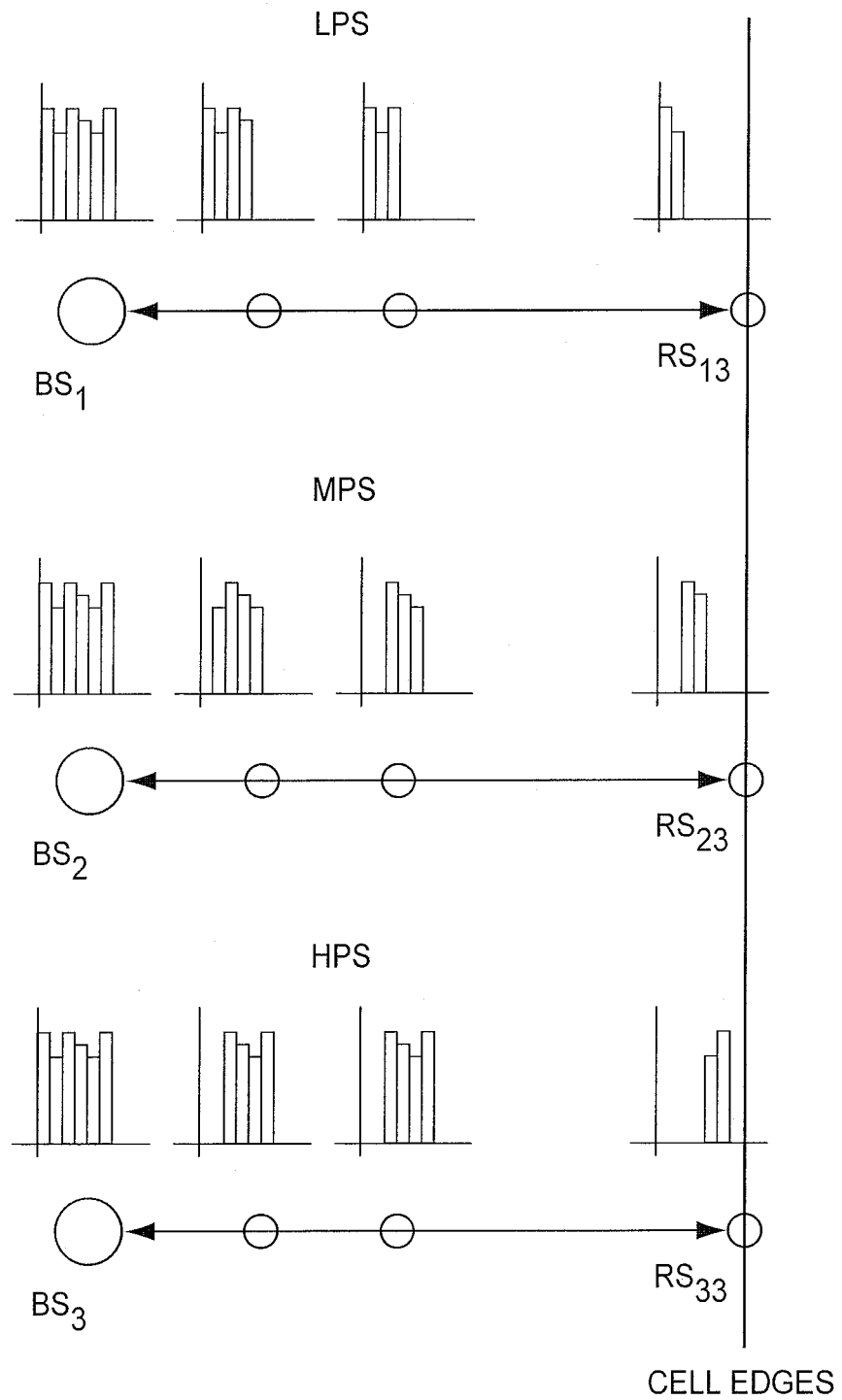
FIG. 24 is a diagram of per-cell spectrum utilization, for an embodiment of SIS, as regards the three-cell example of FIG. 23.

FIG. 24 depicts this contemplated spectrum usage for BS1, BS2, and BS3, and their respectively associated repeater chains 10. One sees that overlap of assigned frequencies in the base station spectrum 20 is minimized at the cell edges—assuming that the furthest relay 14 in each such chain 10 is a cell-edge relay. Thus, the contemplated patterning of spectrum utilization between repeater chains 10 in adjacent cells reduces the interference. That reduction leads to improved power efficiency, and spatial filtering can be used to reduce unwanted emissions.

Thus, one embodiment of SIS involves three neighboring cells of a wireless communication network, each cell having a multi-hop repeater chain 10. The repeater chain 10 in a first one of the cells is configured to use low pass de-aggregation; the repeater chain 10 in a second one of the cells is configured to use middle pass de-aggregation; and the repeater chain 10 in a third one of the cells is configured to use high pass de-aggregation. (Refer back to FIG. 7, for an example of low, middle, and high pass de-aggregation.) Note, too, that the base stations 12 controlling the three neighboring cells can control the various aggregation schemes used by the neighboring repeater chains 10, and that such control can be dynamic, such as through the use of repeater configuration control messages propagated out from the base stations 12 to their respective repeater chains 10.

Those skilled in the art will appreciate that the base stations 12 in neighboring cells may be identical, and differ only in the scheme that each one adopts for assigning frequency resources in the base station spectrum 20 to mobile terminals 16 that are supported by the base station's associated repeater chain 10.

Figure 25:
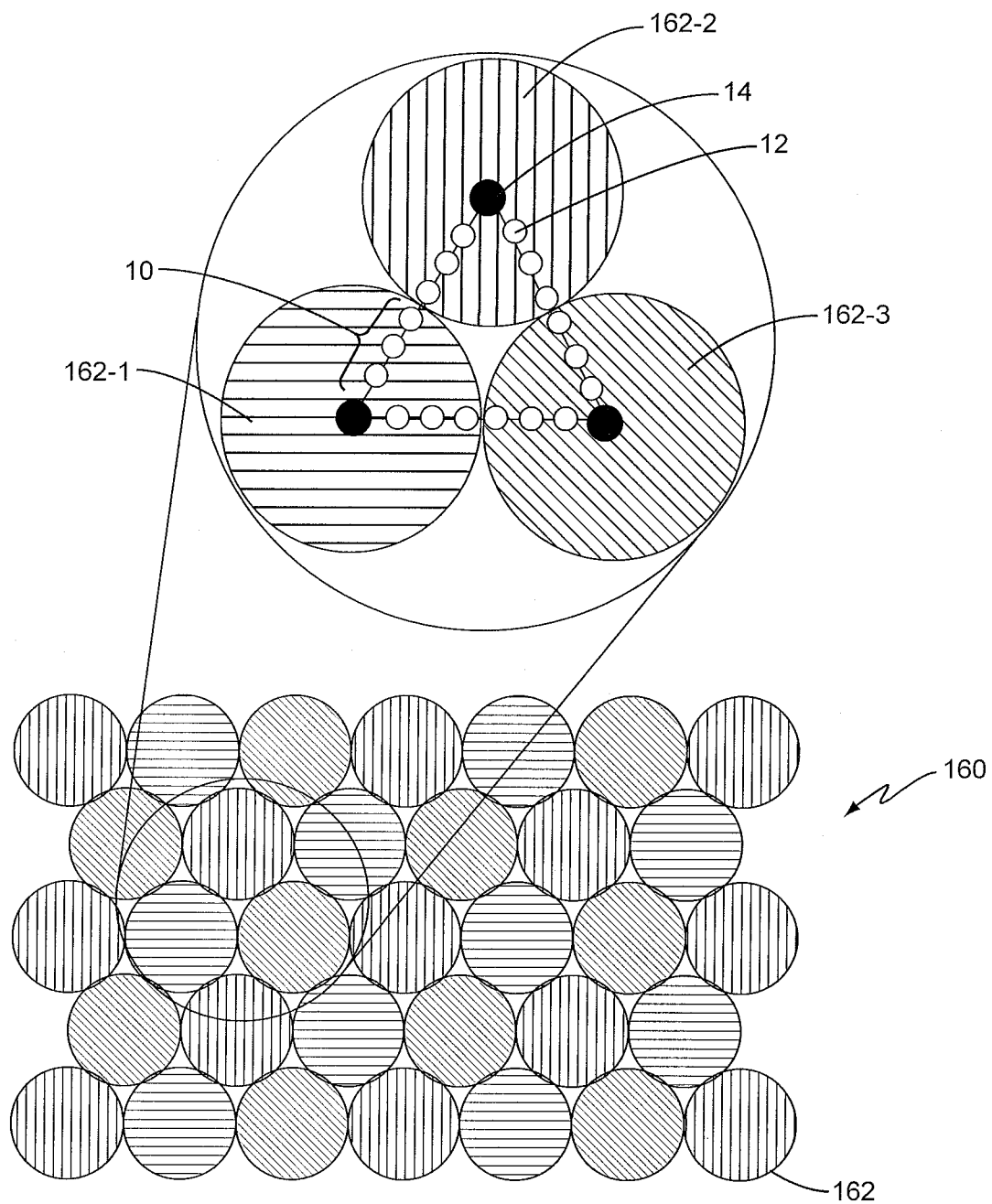
FIG. 25 is a diagram of an example wireless communication network, having a plurality of cells embodying an example SIS pattern.

FIG. 25 illustrates the above-described spectrum interleaving in an example wireless communication network 160, as applied over a large plurality of cells 162. Cells 162 that are hatched with horizontal lines are configured for LPS operation; those hatched with vertical lines are configured for HPS operation; and those hatched with diagonal lines are configured for MPS operation. Further, in the "zoomed" cell view, one sees an example set of three cells 162-1, 162-2, and 162-3. The filled circles at the cell centers depict base stations 12, while the open circles spaced along the lines drawn between base stations 12 depict the repeaters 14 in each cell's repeater chains 10. (Each cell 162 is shown with two repeater chains 10.)

Figure 26:
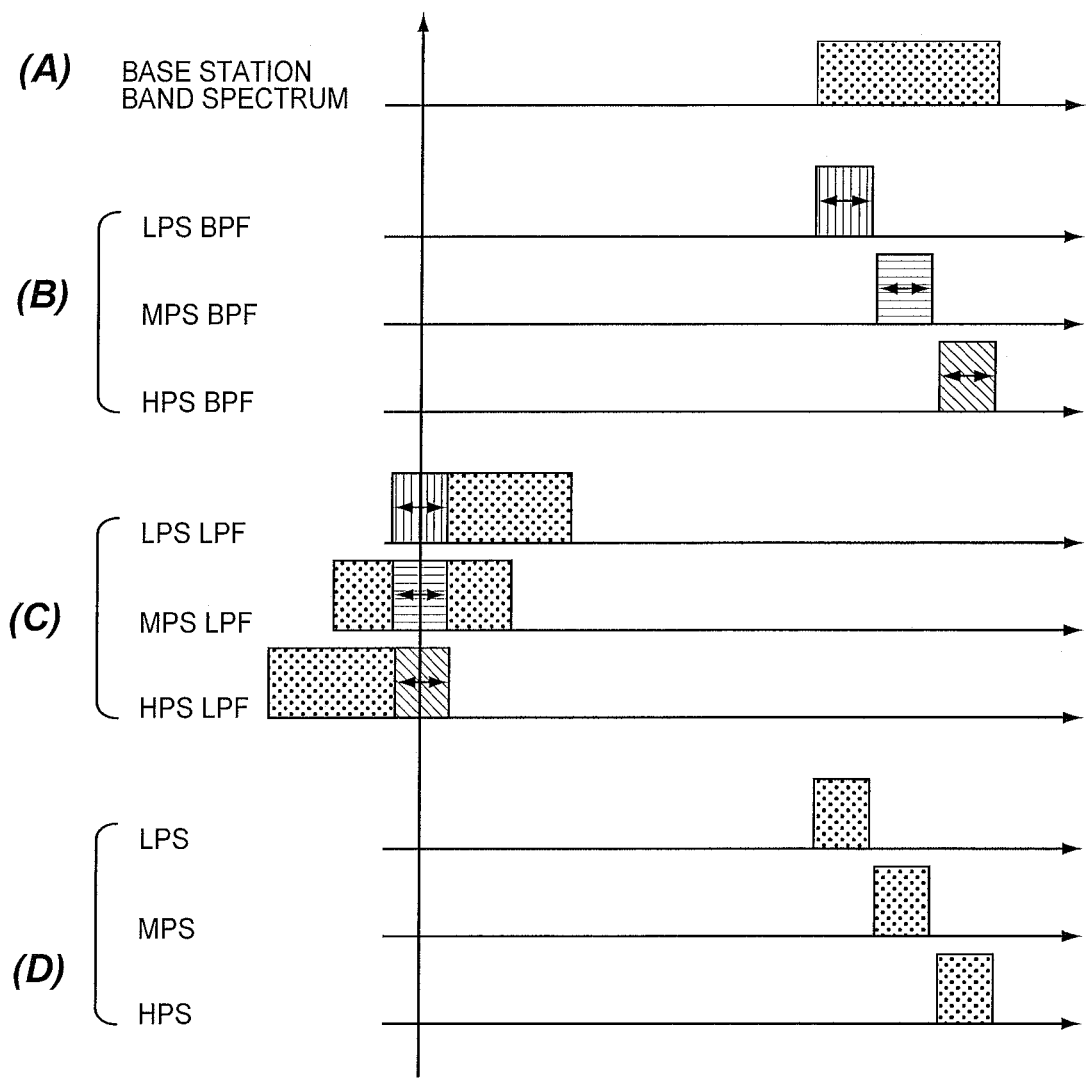
FIG. 26 is a diagram of patterned spectrum usage, for an embodiment of SIS.

FIG. 26 depicts an example desired LPS, MPS and HPS differentiation for downlink signals propagated along repeater chains 10 in neighboring cells. Such spectrum differentiation is, in one or more embodiments, implemented in each involved repeater 14 using configurable filter banks (e.g., the filter banks 70 shown in FIG. 6). That is, each repeater 14 includes dynamically configurable band pass (or low pass) filters and associated frequency translation circuitry in their radio signal processing circuitry. As frequency translation methods are used for the relaying path, the pass band filter functions are all implemented in baseband frequency by variable bandwidth low pass filters. And, after filtering in baseband frequency, the signals are re-modulated to RF frequency for relaying. This is a natural benefit introduced by frequency translation in repeaters 14, i.e., it is straightforward to replace a band pass filter with a low pass filter.

In one embodiment of SIS, each base station 12 communicates with its associated repeater chain 10, to inform the included repeaters 14 of what bandwidth(s) each repeater 14 should remove (or relay), and what center frequencies should be used for the filtering in the downlink. This required information can be integrated into the previously described RCCI data frames. FIG. 26 depicts such a filtering configuration.

In addition to the significant operational advantages provided by SIS embodiments of the teachings presented herein, the use of a repeater frequency spectrum 22 that is non-overlapping with the base station frequency spectrum 20 avoids transmitter leakage at the repeaters 14 (and thereby avoids self-interference problems, reduces in the Error Vector Magnitude (EVM) of transmitted signals, and avoids disturbances in on-frequency repeaters).

As a further non-limiting advantage, the proposed frequency translation techniques increase the channel capacity from base stations 12 to mobile terminals 16, and vice versa. There are always frequency translation pairs available in the respective base station and repeater frequency spectrums 20 and 22, for downlink and uplink propagation up and down the repeater chain 10. Further, in at least one embodiment, the proposed repeaters 14 have the functionality to scan radio bands and find the best radio channels/bands for relaying signals between repeaters 14.

Still further, in at least one embodiment, MIMO is employed to improve quality of the received signals, so the spectrum combining will not lead to poor BER or SER in the end. Additionally, or alternatively, multiple repeaters 14 within the chain may be configured for parallel operation, for diversity transmission/reception benefits, which improve signal SNR, and thus provide better coverage.

Still further, in one or more embodiments, the repeaters 14 in a given chain 10 are configured to use "watermark" test signals, for optimizing the performance of the repeaters without need of decoding in-band channels. That is, a repeater 14 can insert a watermark signal that is known (in terms of modulation, etc.) by that repeater 14, and/or is known by other repeaters 14 in the chain 10. Thus, by injecting such watermark signals into the signals relayed between (or processed within) given repeaters 14, the repeaters 14 can easily determine channel quality, etc., based on evaluating the known watermark signals, rather than decoding the downlink/uplink signals to/from the mobile terminals 16.

On that point, another advantage of avoiding decoding or other such processing of the downlink/uplink signals going between the base station 12 and the mobile terminals 16, the repeater chains 10 presented herein are configured to operate on the physical layer, with minimal delay—e.g., propagation along the full repeater chain 10 introduces a maximum delay that is substantially less than that accommodated by cyclic prefixes used in the base station/mobile terminal signals.

Of course, modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Further, although specific terms may be employed herein, they are used in a generic and descriptive sense only and not for purposes of limitation, unless otherwise noted.

What is claimed is:

1. A multi-hop repeater chain for use with a wireless base station in a wireless communication network, said multi-hop repeater chain configured to de-aggregate downlink signals as they are propagated outward from the base station to mobile terminals along the multi-hop repeater chain, and to aggregate uplink signals as they are propagated inward from mobile terminals along the multi-hop repeater chain to the base station, said multi-hop repeater chain comprising:
   two or more repeaters forming said multi-hop repeater chain, including at least a first repeater and a last repeater;
   each said repeater comprising an uplink transceiver and a downlink transceiver that are configured to conduct repeater-to-mobile-terminal transmissions and mobile-terminal-to-repeater receptions using a base station frequency spectrum and to conduct repeater-to-repeater transmissions and receptions using a repeater frequency spectrum; and
   wherein the first repeater is configured to conduct repeater-to-base-station transmissions and base-station-to-repeater receptions.

2. The multi-hop repeater chain of claim 1, wherein the uplink and downlink transceivers comprise Multiple-Input-Multiple-Output (MIMO) transceivers, supporting MIMO communications between the repeaters and between each repeater and its associated mobile terminals.

3. The multi-hop repeater chain of claim 1, wherein each repeater comprises a Layer 1 repeater.

4. The multi-hop repeater chain of claim 1, wherein, for improved signal-to-noise-ratios, the multi-hop repeater chain is configured to support concurrent multipath communications between (a) a given mobile terminal and (b) two or more repeaters in the multi-hop repeater chain, each sending to or receiving from the mobile terminal in the base station frequency spectrum, or (c) at least one repeater in the multi-hop repeater chain and the wireless base station, each sending to or receiving from the mobile terminal in the base station frequency spectrum.

5. The multi-hop repeater chain of claim 1, wherein, at one or more repeater positions in the multi-hop chain of repeaters, the multi-hop repeater chain includes two or more repeaters operating in a parallel, diversity-transmission mode for at least one of downlink signal retransmissions and uplink signal retransmissions.

6. The multi-hop repeater chain of claim 1, wherein each repeater is configured to limit its usage of the base station frequency spectrum according to base station frequency spectrum assignments of those mobile terminals directly supported by the repeater, such that each repeater operates with less power and causes less interference than if each repeater repeated over the whole base station frequency spectrum.

7. The multi-hop repeater chain of claim 6, wherein each repeater includes a repeater controller that is configured to control communication frequencies of the repeater responsive to receiving configuration messages from a master repeater in the multi-hop repeater chain, or from the base station.

8. The multi-hop repeater chain of claim 1, wherein the multi-hop repeater chain de-aggregates downlink signals as they are propagated outward along the repeater chain by, at each but the last repeater, receiving incoming downlink signals and separating them into first outgoing downlink signals, which are repeated to mobile terminals directly supported by the repeater, and second outgoing downlink signals, which are relayed to the next downstream repeater in the multi-hop repeater chain to support other mobile terminals indirectly.

9. The multi-hop repeater chain of claim 1, wherein the multi-hop repeater chain aggregates uplink signals as they are propagated inward along the repeater chain by, at each but the last repeater, receiving first incoming uplink signals transmitted from mobile terminals directly supported by the repeater, receiving second incoming uplink signals relayed from the next downstream repeater in the multi-hop repeater chain, combining the first and second incoming uplink signals into outgoing uplink signals, and repeating the outgoing uplink signals to the base station if the repeater is the first repeater, or otherwise relaying them to the next upstream repeater in the multi-hop repeater chain.

10. The multi-hop repeater of claim 1, wherein the downlink transceiver in each intermediate repeater in the multi-hop repeater chain is configured to receive incoming downlink signals relayed from the next upstream repeater, separate the incoming downlink signals into first outgoing downlink signals, which are targeted to mobile terminals directly supported by the repeater, and second outgoing downlink signals, which are targeted to mobile terminals indirectly supported by the repeater, and further configured to repeat the first outgoing downlink signals in the base station frequency spectrum, for reception by mobile terminals directly supported by the repeater, and relay the second outgoing downlink signals in the repeater frequency spectrum, for reception by the next downstream repeater in the multi-hop repeater chain.

11. The multi-hop repeater chain of claim 10, wherein the downlink transceiver includes a receiver for receiving the incoming downlink signals, a first transmitter for repeating the first outgoing downlink signals, and a second transmitter for relaying the second outgoing downlink signals, and wherein the downlink transceiver further includes a spectrum processor that includes an analog or digital baseband filter circuit that is configurable for separating the incoming downlink signals into the first and second outgoing downlink signals, according to base station frequency spectrum assignments of the mobile terminals directly supported by the repeater.

12. The multi-hop repeater of claim 1, wherein the uplink transceiver in each intermediate repeater in the multi-hop repeater chain is configured to receive first incoming uplink signals transmitted from mobile terminals directly supported by the repeater and second incoming uplink signals relayed from the next downstream repeater, and to combine the first and second incoming uplink signals into outgoing uplink signals, for relaying to the next upstream repeater in the multi-hop repeater chain.

13. The multi-hop repeater chain of claim 12, wherein the uplink transceiver includes a first receiver for receiving the first incoming uplink signals, a second receiver for receiving the second incoming uplink signals, and a transmitter for relaying the outgoing uplink signals, and wherein the uplink transceiver further includes a spectrum processor that includes an analog or digital baseband combining circuit that is configurable for combining the first and second incoming uplink signals.

14. The multi-hop repeater chain of claim 1, wherein the downlink transceiver in the first repeater includes a first transmitter for repeating first outgoing downlink signals in the base station frequency spectrum, for reception by mobile terminals directly supported by the repeater, and a second transmitter for relaying second outgoing downlink signals in the repeater frequency spectrum, for reception by the next downstream repeater in the multi-hop repeater chain, and further includes a receiver for receiving incoming downlink signals transmitted from the base station, and a spectrum processor that includes an analog or digital baseband filter circuit for separating the incoming downlink signals into said first and second outgoing downlink signals.

15. The multi-hop repeater chain of claim 1, wherein the uplink transceiver in the first repeater includes a first receiver for receiving first incoming uplink signals transmitted from mobile terminals directly supported by the repeater, a second receiver for receiving second incoming uplink signals relayed from the next downstream repeater in the multi-hop repeater chain, a spectrum processor that includes an analog or digital baseband combining circuit that is configurable for combining the first and second incoming uplink signals, to form outgoing uplink signals, and a transmitter for repeating the outgoing uplink signals to the base station in the base station frequency spectrum.

16. The multi-hop repeater chain of claim 1, wherein the first repeater is co-located with the base station.

17. The multi-hop repeater chain of claim 1, wherein each repeater includes a frequency-configurable spectrum processor that is dynamically configurable for desired aggregating and de-aggregating operations at the repeater.

18. The multi-hop repeater chain of claim 1, wherein one or more of the repeaters includes a spectrum analyzer and an associated controller, for identifying, according to interference measurements, particular frequency bands within the repeater frequency spectrum to be used by one or more of the repeaters, for repeater-to-repeater communications.

19. The multi-hop repeater chain of claim 1, wherein each repeater includes a spectrum analyzer and an associated controller, wherein the controller is configured to make interference measurements within the repeater frequency spectrum to identify one or more preferred frequency bands in the repeater frequency spectrum, for use by the repeater in relaying uplink or downlink signals.

20. The multi-hop repeater chain of claim 19, wherein each repeater further includes a repeater-to-repeater control interface, and wherein the controller in each repeater is configured either to select the preferred frequency bands and report the selected frequency bands to the other repeaters to avoid relaying conflicts between repeaters, or to report the preferred frequency bands to a master repeater and correspondingly receive frequency band assignments from the master repeater.

21. The multi-hop repeater chain of claim 1, wherein the multi-hop repeater chain of claim 1 comprises one in a plurality of like multi-hop repeater chains, each configured in a corresponding one in a plurality of neighboring cells in a wireless communication network, and wherein the multi-hop repeater chains are configured to use different patterns of base station frequency spectrum assignments for repeater-supported mobile terminals, such that the repeaters close to a cell edge in a given one of the cells communicates with mobile terminals using different portions of the base station frequency spectrum than are used by the other repeaters close to cell edges in adjacent ones of the neighboring cells.

22. The multi-hop repeater chain of claim 1, wherein each repeater includes at least one of (a) one or more variable bandwidth band pass filters or (b) one or more low-pass filters and frequency translation circuits, which are configurable via one or more control messages received by the repeater, for aggregating uplink signals and de-aggregating downlink signals at the repeater.

23. The multi-hop repeater chain of claim 1, wherein, for at least one repeater in the repeater chain, at least one of the uplink and downlink transceivers includes beam forming circuits and antenna elements, for point-to-point communications with a next repeater, or with the wireless base station.

24. The multi-hop repeater chain of claim 1, wherein the multi-hop repeater chain of claim 1 comprises one in a set of three like multi-hop repeater chains, each configured in a corresponding one of three neighboring cells in a wireless communication network, and wherein the repeater chain in a first one of the cells is configured to use low pass de-aggregation, the repeater chain in a second one of the cells is configured to use middle pass de-aggregation, and the repeater chain in a third one of the cells is configured to use high pass de-aggregation.

25. A method of repeater-based communications in a cell within a wireless communication network, said method comprising de-aggregating downlink signals as they are propagated outward along the multi-hop repeater chain from a base station in the cell, and aggregating uplink signals as they are propagated inward along the multi-hop repeater chain to the base station:
said de-aggregating comprising each but the last repeater relaying to a next repeater those downlink signals that are targeted to mobile stations indirectly supported by the repeater, and each repeater repeating those downlink signals that are targeted to mobile terminals directly supported by the repeater; and
said aggregating comprising each but the first repeater relaying to the next upstream repeater those uplink signals received from mobile stations directly supported by the repeater, each but the last repeater further relaying those uplink signals received from the next downstream repeater, and the first repeater repeating to the base station those uplink signals received from the next downstream repeater and those uplink signals received from the mobile terminals directly supported by the first repeater; and
wherein each said repeater relays in a repeater frequency spectrum and repeats in a base station frequency spectrum.

26. The method of claim 25, wherein each repeater comprises a Multiple-Input-Multiple-Output (MIMO) Orthogonal Frequency Division Multiplex (OFDM) repeater, and wherein said relaying and repeating of uplink and downlink signals are performed by the multi-hop repeater chain, and comprises relaying and repeating MIMO OFDM uplink and downlink signals.

27. The method of claim 25, further comprising operating the multi-hop repeater chain as a chain of Layer 1 repeaters.

28. The method of claim 25, further comprising, for improved signal-to-noise-ratios, providing concurrent multipath communications between (a) a given mobile terminal and (b) two or more repeaters in the multi-hop repeater chain, each sending to or receiving from the mobile terminal in the base station frequency spectrum, or (c) at least one repeater in the multi-hop repeater chain and the wireless base station, each sending to or receiving from the mobile terminal in the base station frequency spectrum.

29. The method of claim 25, wherein, at one or more repeater positions in the multi-hop chain of repeaters, the multi-hop repeater chain includes two or more repeaters and the method further comprises operating those said two or more repeaters in a parallel, diversity-transmission mode.

30. The method of claim 25, wherein said de-aggregating includes each repeater limiting its usage of the base station frequency spectrum according to base station frequency spectrum assignments of those mobile terminals directly supported by the repeater, such that each repeater consumes less power and causes less interference than if the repeater repeated over the whole base station frequency spectrum.

31. The method of claim 30, further comprising, at each repeater, receiving one or more configuration messages, for controlling communication frequencies of the repeater, and correspondingly configuring said communication frequencies of the repeater according to the configuration messages.

32. The method of claim 25, wherein said de-aggregating comprises, at each but the last repeater, receiving incoming downlink signals and separating them into first outgoing downlink signals, which are repeated in the base station frequency spectrum to mobile terminals directly supported by the repeater, and second outgoing downlink signals, which are targeted to mobile terminals indirectly supported by the repeater, and which are relayed in the repeater frequency spectrum to the next downstream repeater.

33. The method of claim 25, wherein said aggregating comprises, at each but the last repeater, receiving first incoming uplink signals transmitted from mobile terminals directly supported by the repeater, receiving second incoming uplink signals relayed from the next downstream repeater, combining the first and second incoming uplink signals into outgoing uplink signals, and repeating the outgoing uplink signals to the base station, if the repeater is the first repeater, or otherwise relaying them to the next preceding repeater.

34. The method of claim 25, wherein said de-aggregating comprises, at each intermediate repeater, receiving incoming downlink signals relayed from the next upstream repeater in the repeater frequency spectrum, separating the incoming downlink signals into first outgoing downlink signals, which are targeted to mobile terminals directly supported by the repeater, and second outgoing downlink signals, which are targeted to mobile terminals indirectly supported by the repeater, and further comprises repeating the first outgoing downlink signals in the base station frequency spectrum, for reception by mobile terminals directly supported by the repeater, and relaying the second outgoing downlink signals in the repeater frequency spectrum, for reception by the next downstream repeater.

35. The method of claim 34, further comprising receiving the incoming downlink signals in the repeater frequency spectrum using a first receiver, processing the incoming downlink signals in a baseband filter separating and translating in frequency, as needed, to obtain first and second outgoing downlink signals, repeating the first outgoing downlink signals in the base station frequency spectrum, and relaying the second outgoing downlink signals in the repeater frequency spectrum, wherein separating the incoming downlink signals into the first and second outgoing downlink signals is based on base station frequency spectrum assignments for the mobile terminals directly supported by the receiver.

36. The method of claim 25, wherein said aggregating includes, at each intermediate repeater in the multi-hop repeater chain, receiving first incoming uplink signals transmitted from mobile terminals in the base station frequency spectrum, receiving second incoming uplink signals relayed from the next succeeding repeater in the repeater frequency spectrum, combining the first and second incoming uplink signals into outgoing uplink signals, and relaying the outgoing uplink signals in the repeater frequency spectrum, to the next preceding repeater.

37. The method of claim 36, wherein combining the first and second incoming uplink signals includes converting them to baseband signals, combining them at baseband to form the outgoing uplink signals, and then shifting the outgoing uplink signals into the repeater frequency spectrum, for relaying to the next preceding repeater.

38. The method of claim 25, wherein said de-aggregating comprises, in the first repeater, receiving incoming downlink signals transmitted from the base station in the base station frequency spectrum, shifting the incoming downlink signals to baseband and separating them into first outgoing downlink signals targeted to mobile terminals directly supported by the first repeater and second outgoing downlink signals targeted to mobile terminals not directly supported by the first repeater, shifting the first outgoing downlink signals into the base station frequency spectrum and repeating them for reception by the mobile terminals directly supported by the first repeater, and shifting the second outgoing downlink signals into the repeater frequency spectrum and relaying them for reception by the next downstream repeater.

39. The method of claim 25, wherein said aggregating comprises, in the first repeater, receiving first incoming uplink signals transmitted in the base station frequency spectrum from mobile terminals directly supported by the first repeater, receiving second incoming uplink signals relayed in the repeater frequency spectrum from the next downstream repeater, shifting the first and second incoming uplink signals into baseband and combining them to form outgoing uplink signals, shifting the outgoing uplink signals into the base station frequency spectrum and repeating them to the base station.

40. The method of claim 25, further comprising dynamically configuring each repeater for desired aggregating and de-aggregating operations at the repeater.

41. The method of claim 25, further comprising measuring interference in the repeater frequency spectrum and correspondingly setting particular frequency bands in the repeater frequency spectrum, to be used by the repeaters for relaying.

42. The method of claim 25, further comprising, dynamically selecting at each repeater which particular frequency band or bands in the repeater frequency spectrum, to be used for relaying by that repeater, and advertising among the repeaters the particular frequency bands selected at each repeater.

43. The method of claim 42, further comprising receiving, at a master one of the repeaters, interference measurements from each repeater for the repeater frequency spectrum, determining repeater frequency spectrum assignments for each repeater at the master repeater according to the interference measurements, and sending the repeater frequency spectrum assignments from the master repeater to the other repeaters.

44. The method of claim 25, wherein the multi-hop repeater chain comprises one in a plurality of like multi-hop repeater chains, each configured in a corresponding one in a plurality of neighboring cells in a wireless communication network, and wherein the method further comprises using at the different multi-hop repeater chains different patterns of base station frequency spectrum assignments for repeater-supported mobile terminals, such that the last repeater at a cell edge in a given one of the cells repeats different portions of the base station frequency spectrum than the last repeater at a cell edge in an adjacent given one of the cells.

45. The method of claim 25, further comprising performing said aggregating and de-aggregating at each repeater via (a) one or more variable bandwidth band pass filters or (b) one or more low-pass filters and associated frequency translation circuits, which are configurable via one or more control messages received by the repeater, for aggregating uplink signals and de-aggregating downlink signals at the repeater.

46. The method of claim 25, further comprising performing beam forming at one or more of the repeaters, for point-to-point communications with a next repeater, or with the wireless base station.

47. The method of claim 25, further comprising performing said method in each of three neighboring cells, each cell having its own multi-hop repeater chain, including configuring the repeater chain in a first one of the cells to use low pass de-aggregation, configuring the repeater chain in a second one of the cells to use middle pass de-aggregation, and configuring the repeater chain in a third one of the cell to use high pass de-aggregation.

* * * * *

UNITED STATES PATENT AND TRADEMARK OFFICE
CERTIFICATE OF CORRECTION

PATENT NO. : 8,472,868 B2
APPLICATION NO. : 12/639169
DATED : June 25, 2013
INVENTOR(S) : Mu et al.

Page 1 of 1

It is certified that error appears in the above-identified patent and that said Letters Patent is hereby corrected as shown below:

In the Specification

In Column 14, Line 20, delete "as bands" and insert -- as --, therefor.

In Column 19, Line 48, delete "$D_{bi,}$" and insert -- $D_{bi}$, --, therefor.

In the Claims

In Column 28, Line 13, in Claim 10, delete "repeater" and insert -- repeater chain --, therefor.

In Column 28, Line 39, in Claim 12, delete "repeater" and insert -- repeater chain --, therefor.

Signed and Sealed this
Twenty-sixth Day of November, 2013

Margaret A. Focarino
*Commissioner for Patents of the United States Patent and Trademark Office*